US010496306B1

(12) United States Patent
Srivastava et al.

(10) Patent No.: US 10,496,306 B1
(45) Date of Patent: Dec. 3, 2019

(54) PREDICTIVE FORECASTING AND DATA GROWTH TREND IN CLOUD SERVICES

(71) Applicant: Oracle International Corporation, Redwood Shores, CA (US)

(72) Inventors: Gaurav Srivastava, Greater Noida (IN); Senthamarai Kannan Poovalingam, Mountain View, CA (US); Arnab Acharya, Asansol (IN)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 16/004,638

(22) Filed: Jun. 11, 2018

(51) Int. Cl.
*G06F 9/46* (2006.01)
*G06F 3/06* (2006.01)
*G06F 9/50* (2006.01)

(52) U.S. Cl.
CPC .......... *G06F 3/0631* (2013.01); *G06F 3/0604* (2013.01); *G06F 3/0673* (2013.01); *G06F 9/5011* (2013.01)

(58) Field of Classification Search
None
See application file for complete search history.

(56) References Cited

U.S. PATENT DOCUMENTS

| | | |
|---|---|---|
| 6,542,893 B1 | 4/2003 | Quernemoen |
| 7,779,304 B2 | 8/2010 | Jennings |
| 8,200,615 B2 | 6/2012 | Halliday |
| 8,694,906 B2 | 4/2014 | Cole et al. |
| 8,966,218 B2 | 2/2015 | Reed et al. |
| 8,983,913 B2 | 3/2015 | Held |
| 9,215,142 B1 | 12/2015 | Herold et al. |
| 2003/0225563 A1 | 12/2003 | Gonos |
| 2012/0144332 A1 | 6/2012 | Sola et al. |
| 2013/0219044 A1 | 8/2013 | Maheshwari et al. |
| 2014/0055458 A1 | 2/2014 | Bogdany et al. |
| 2015/0046204 A1 | 2/2015 | Sitina et al. |

(Continued)

FOREIGN PATENT DOCUMENTS

WO WO2015183940 A1 12/2015

OTHER PUBLICATIONS

Prasad et al. "Predicting Future Resource Requirement for Efficient Resource Management in Cloud," International Journal of Computer Applications pp. 19-23 (Sep. 2014).

(Continued)

*Primary Examiner* — Gregory A Kessler
(74) *Attorney, Agent, or Firm* — Kilpatrick Townsend & Stockton LLP

(57) ABSTRACT

Provided are systems and methods for operating a computing system in a data center to assist in the management of the resources of the data center. In various examples, the computing system can monitor use of the resources by tenants. Using data obtaining by monitoring the resources, the computing system can predict the expected use of the resources. The predicted use, or growth data, can be used by various systems in the data center. The growth data can be used by a provisioning system to adjust the sizes of bundles of resources, so that the sizes of the bundles of resources more accurately reflect the manner in which tenants will use the bundles of resources when the bundles of resources are allocated to the tenants. The growth data can be used by a life cycle management system to proactively recycle data before a tenant runs out of storage space.

21 Claims, 12 Drawing Sheets

(56) References Cited

U.S. PATENT DOCUMENTS

2015/0066600 A1   3/2015   Naseh et al.

OTHER PUBLICATIONS

"Server Health Monitoring," © 2003-2016 SolarWinds Worldwide, LLC, downloaded Jun. 24, 2016 http://www.solarwinds.com/topics/server-health-monitoring.

"SAP Standard for Data Volume Management," © 2014 SAP SE (Dec. 12, 2014) 40 pages.

Hansen "How to accurately predict database growth in Dynamics AX," Microsoft Developer Network Blog (Jun. 12, 2011) 1 page.

Shavit "Predicting data storage growth," SearchITChannel © 2006-2015 TechTarget (May 2008) 5 pages.

"Capacity Planning," © Copyright 1999-2015 PaperCut Software International Pty Ltd., downloaded Dec. 30, 2015 http://www.papercut.com, 4 pages.

"Estimate the Size of a Database: SQL Server 2016," © 2015 Microsoft, downloaded Dec. 30, 2015 https://msdn.microsoft.com, 1 page.

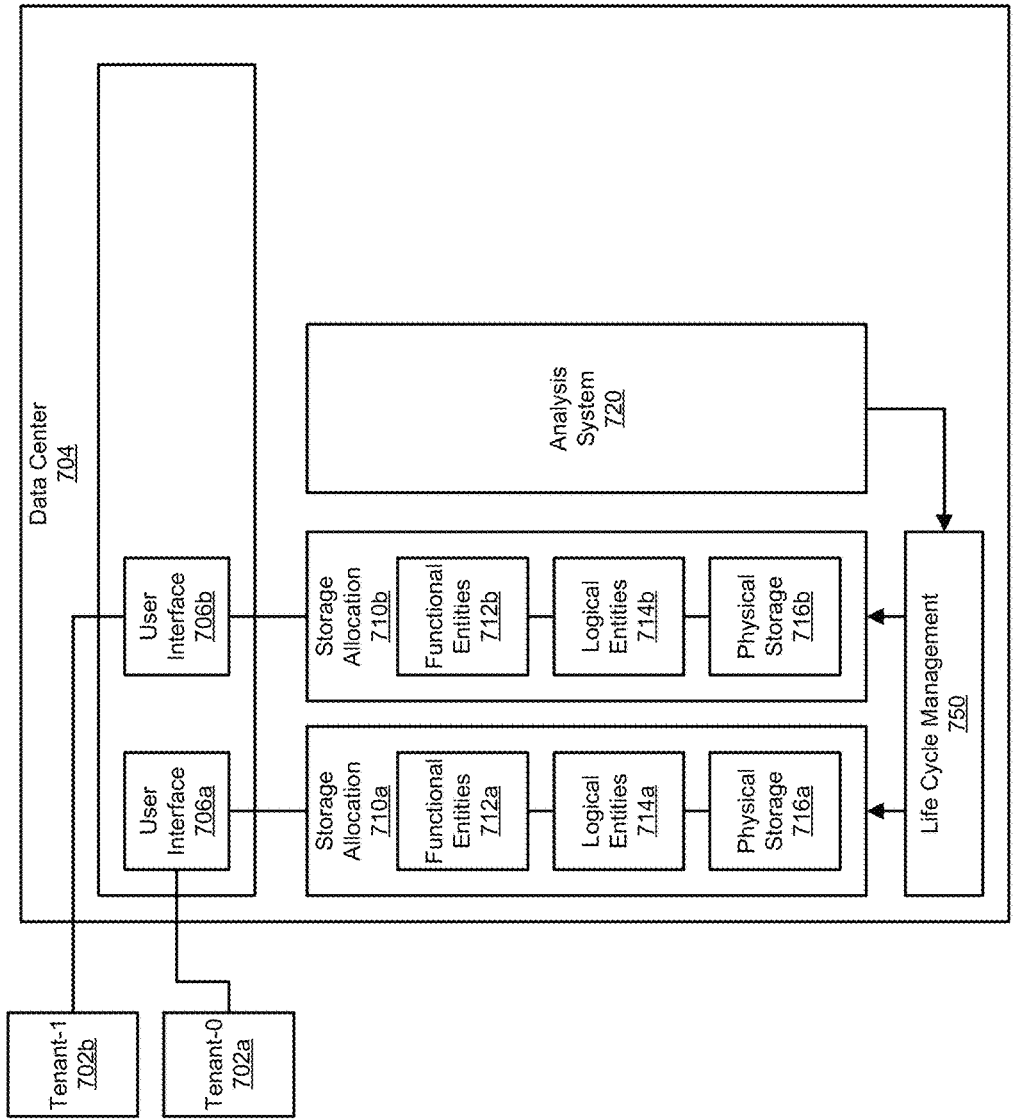

800

802
Monitoring changes to data in a storage allocation, wherein the storage allocation includes a set of computing resources from computing resources of the data center, wherein the storage allocation is associated with a tenant of the data center, wherein the data center enables users associated with the tenant to use the set of computing resources during a subscription period, and wherein the storage allocation is associated with a category from a plurality of categories for storage allocations

804
Determining an expected resource usage for the storage allocation, wherein the expected resource usage projects an amount of computing resources the storage allocation will use after a period of time following a current time

806
Determining that the expected resource usage is greater than a size of a bundle of resources from a resource pool, wherein the bundle of resources includes a set of unused computing resources that has been pre-allocated for use as a new storage allocation of a same category as the category for the storage allocation, wherein the size of the bundle of resources corresponds to an amount of the set of unused computing resources

808
Instructing a provisioning system of the data center to increase the size of the bundle of resources to correspond to the expected resource usage for the storage allocation, wherein increasing the size of the bundle of resources includes allocating additional unused computing resources to the bundle of resources

FIG. 8

PREDICTIVE FORECASTING AND DATA GROWTH TREND IN CLOUD SERVICES

BACKGROUND

The present disclosure relates to predicting the future resource needs in a data center, and use of the prediction by systems in the data center to more efficiently manage the resources of the data center.

A data center can include various computing resources, including processing resources, storage resources, and networking resources, among others. In some examples, the data center operator can lease computing resources to subscribers. For example, an organization can lease computing resources to operate a website. In these examples, the data center can organize computing resources into storage allocations, which can provide a way to compartmentalize and keep separate the resources being used by different tenants. The data center can further include automated systems for on-boarding new subscriptions and managing the data in active storage allocations.

BRIEF SUMMARY

In various implementations, provided are systems and methods for operating a computing system in a data center, where operations executed by the computing system can assist in the management of the resources of the data center. In various examples, the computing system can be configured to monitor use of the resources by tenants. Using data obtaining by monitoring the resources, the computing system can predict the expected use of the resources. The predicted use, or growth data, can be used by various systems in the data center. For example, the growth data can be used by a provisioning system to adjust the sizes of bundles of resources, so that the sizes of the bundles of resources more accurately reflect the manner in which tenants will use the bundles of resources when the bundles of resources are allocated to the tenants. As another example, the growth data can be used by a life cycle management system to proactively recycle data before a tenant runs out of storage space.

In various implementations, methods, including computer-implemented methods, computing systems, and computer-readable medium can include techniques for using growth data. These techniques can include monitoring changes to data in a storage allocation. The storage allocation can include a set of computing resources from computing resources of the data center. The storage allocation can be associated with a tenant of the data center, where the data center enables users associated with the tenant to use the set of computing resources during a subscription period. The storage allocation can be associated with a category from a plurality of categories for storage allocations. The techniques can further include determining an expected resource usage for the storage allocation. The expected resource usage can project an amount of computing resources the storage allocation will use after a period of time following a current time. The expected resource usage can be determined using the changes to the data. The techniques further include determining that the expected resource usage is greater than a size of a bundle of resources from a resource pool. The bundle of resources can include a set of unused computing resources that has been pre-allocated for use as a new storage allocation of a same category as the category for the storage allocation. The size of the bundle of resources can correspond to an amount of the set of unused computing resources. The techniques further include instructing a provisioning system of the data center to increase the size of the bundle of resources to correspond to the expected resource usage for the storage allocation. Increasing the size of the bundle of resources can include allocating additional unused computing resources to the bundle of resources.

In some aspects, before the provisioning system is configured to increase the size of the bundle of resources, the bundle of resources has a first size. In these aspects, the storage allocation was configured from a second bundle of resources from the resource pool, the second bundle of resources being the first size.

In some aspects, techniques implemented by the methods, computing systems, and computer-readable medium discussed above can further include receiving a request for a second storage allocation. In these aspects, the techniques can further include determining that the request is associated with a subscription of the same category as the category for the storage allocation. The techniques can further include instructing the provisioning system to configure the bundle of resources according to the request. When configured, the set of unused computing resources and the additional unused computing resources included in the bundle of resources can be assigned to the second storage allocation.

In some aspects, techniques implemented by the methods, computing systems, and computer-readable medium discussed above can further include determining an expected number of storage allocations for the category. The expected number of storage allocations can project storage allocations for subscriptions expected to be received after the current time. These aspects can further include determining that the expected number of storage allocations is greater than a number of bundles of resources associated with the category. These aspects can further include allocating additional bundles of resources. Allocating the additional bundles of resources can include allocating additional unused computing resources to each of the additional bundles of resources.

In some aspects, unused computing resources are computing resources that are not allocated to storage allocations.

In some aspects, increasing the size of the bundle of resources includes allocating unused physical storage to the bundle of resources.

In some aspects, the data center includes a pool of physical resources. In these aspects, a first portion of the pool of physical resources can be included in the storage allocation. A second portion of the pool of physical resources can be included in the bundle of resources. A third portion of the pool of physical resources is not allocated before the provisioning system is instructed to increase the size of the bundle of resources.

In some aspects, computing resources include processing resources, storage resources, or networking resources.

In some aspects, techniques implemented by the methods, computing systems, and computer-readable medium discussed above can further include determining a mapping between a functional entity of the storage allocation and physical storage associated with the storage allocation. A functional entity can represent data in the storage allocation. In these aspects, the expected resource usage can be determined used the mapping.

The foregoing, together with other features and implementations will become more apparent upon referring to the following specification, claims, and accompanying drawings.

BRIEF DESCRIPTION OF THE DRAWINGS

FIG. 7 illustrates an example of a data center that includes life cycle management for the storage allocations in the data center.

FIG. 8 illustrates an example of a process for using growth data to adjust bundles of resources in a resource pool.

DETAILED DESCRIPTION

Figure 1:
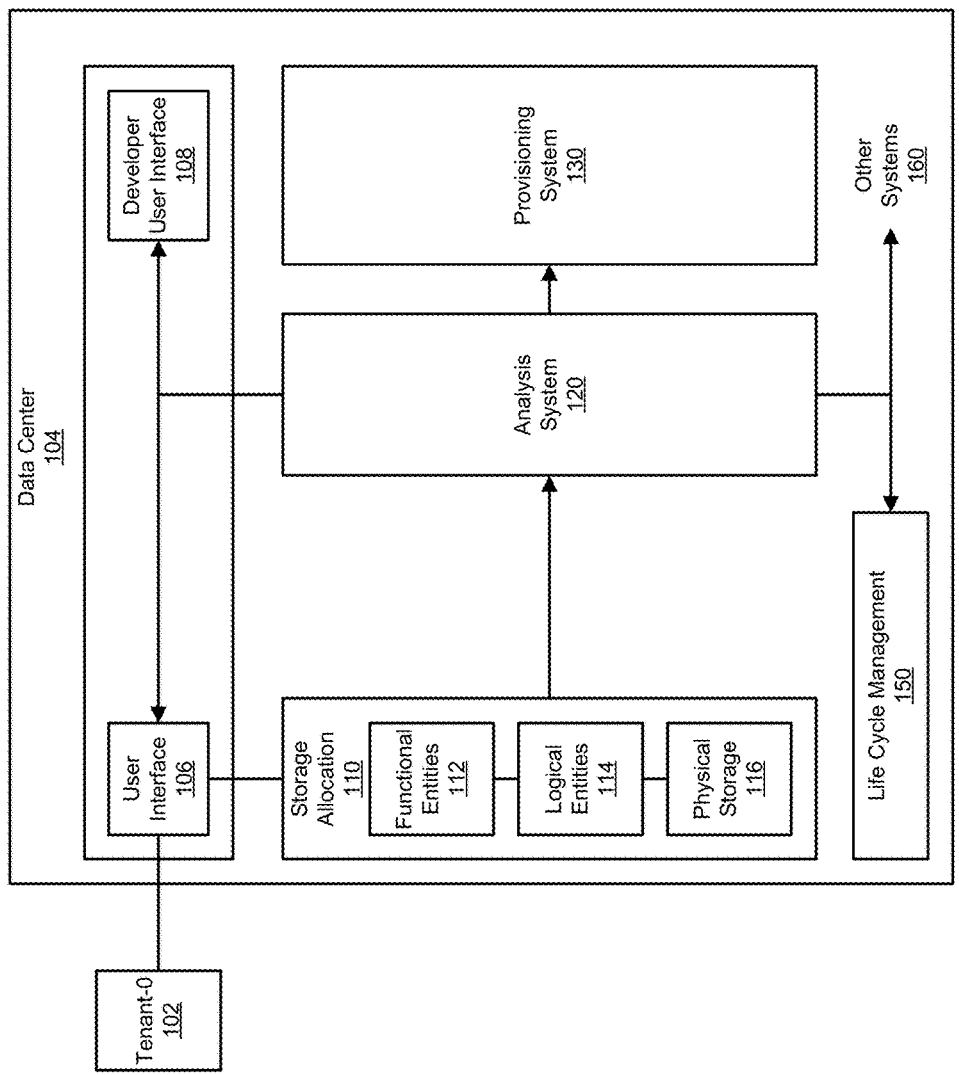
FIG. 1 illustrates an example of a data center that includes an analysis system that can determine future resource needs for tenants of the data center.

Cloud services include various hardware and software resources that are hosted by a provider of these resources for use by others (referred to as "customers," "subscribers," or "tenants"). For example, a cloud services provider can operate a data center, which can include computing systems executing various applications and network infrastructure. In this example, the cloud services provider can lease hardware, applications, and/or network infrastructure to tenants. The tenants can then use the hardware, applications, and/or network infrastructure according to each tenant's particular needs. As another example, a cloud services provider can itself be a tenant of another cloud services provider. For example, a first cloud services provider can host a service using the infrastructure (e.g., in a data center) of second cloud services provider. The first cloud services provider can then lease services to tenants.

Examples of the services models used by cloud service providers (also referred to herein as "cloud providers" or "providers") include infrastructure as a service (IaaS), platform as a service (PaaS), software as a service (SaaS), and network as a service (NaaS), among others. IaaS providers provide tenants with infrastructure resources such as processing capacity, storage, networks, and other computing resources that the tenant is able to use to run software. The tenant does not manage the infrastructure, but has control over operating systems, storage, and deployed applications, among other things, and may be able to control some networking components, such as firewalls. PaaS providers provide a tenant with a platform on which the customer can develop, run, and manage an application without needing to maintain the underlying computing infrastructure. SaaS is a software licensing and delivery model in which software is licensed to a tenant on a subscription basis, and is centrally hosted by the cloud provider. Under this model, applications can be accessed, for example, using a web browser. NaaS providers provide network services to tenants, for example by provisioning a virtual network on the network infrastructure operated by another party. In each of these service models, the cloud service provider maintains and manages the hardware and/or software that provide the services, and little, if any, software executes on a user's device.

In various examples, a cloud services provider allocates to a tenant a set of resources, for which the tenant subscribes for a pre-determined period of time. From the point of view of the tenant, the resources can be organized into functional entities, such as user accounts, user account types, user account groups, and user account privileges, among other things. An identity cloud Service, for example, can have functional entities such as user identity data, audit snapshots, authorization tokens, and process job histories, among other things. A load balancer cloud service, as another example, can have functional entities such as service logs, and routing requests, Domain Name Service (DNS) activity data, among other things Within an allocation for a tenant, functional entities can map to logical entities, which can reflect the manner in which the cloud services provider manages the functional entities. For example, logical entities can include databases, database tables, and/or database entries in which information for the functional entities is organized and stored. The logical entities can have corresponding physical entities, or physical hardware where the data is stored. Examples of physical entities include data files and storage on a disk, among other things.

When a tenant subscribes to a cloud service, the tenant can receive an allocation of functional entities. For example, the tenant can receive an allocation of 100 user accounts each having an email account and allotment of 1 gigabyte (GB) of disk space. In this example, the tenant can individually activate and put each user account into use. Once a user account is activated, the user account can generate and receive email, which is stored in the user account's disk space allotment.

In the preceding example, the tenant may not be able to determine the rate at which the tenant's allocation of user accounts and disk space is being consumed. For example, the tenant may not have sufficient data to understand whether the tenant's allocation will run out in the next year or the next week. Additionally, without an understanding of the rate at which resources are, or will be consumed, when the tenant's lease period ends and the tenant needs to renew, the tenant may not know how much more of an allocation the tenant should request. The cloud services provider may be able to report to the tenant information such as current physical storage available or database table usage, but this information may not be sufficient for a tenant to project future needs.

A data center operator may also need to understand the rate at which the resources of the data center are being consumed. In some examples, the data center operator pre-allocates resources in pre-set configurations, so that assigning allocations to tenants can occur very quickly. The sizes of the pre-allocated resources can estimated; however, if the estimates do not reflect tenants' projected usage of the resources, then the pre-allocations may be inadequate and tenants may run out of resources to quickly. As another example, without a projection of future usage of the data center's resources, the data center operator may not be able to determine when it may be necessary to add more resource and how many resources to add.

In various implementations, provided are systems and techniques for analyzing a tenant's usage of the tenant's storage allocation, and projecting the tenant's growth, in terms of resource usage. In various implementations, an analysis system can collect information about the functional resources and the physical resources associated with a tenant, and can forecast the data growth of the tenant in terms of the tenant's functional resources rather than only in terms of physical resources. The data predicted for each tenant can include, for example, the average rate of storage consumption, a storage forecast for a given period of time (e.g., the next seven days), the fastest growing resource associated with the tenant, resource data distribution, resource growth trend, and data inflow and outflow for the tenant, among other things. Using this data, the analysis system can provide a comprehensive analysis of the tenant's future resource needs, which a data center operator can use to more efficiently manage the resources of the data center.

In addition to providing growth data for a tenant, in various implementations, an analysis system can further project growth for tenants of various types, for a data center as a whole, and/or across data centers. A data center operator can use this growth data in various ways. For example, the growth data can be used by an automated provisioning system to adjust the size of pre-allocated bundles of resources, so that the bundles of resources better anticipate the needs of various tenants. As another example, the growth data can be used automatically purge data and recover physical storage for a tenant, an operation referred to herein as life cycle management. In this example, purging of a tenant's data can occur in a manner that is consistent with the tenant's usage, rather than on a fixed schedule.

In addition to a provisioning system that anticipates tenant's resource needs and intelligent life cycle management, the growth data can have additional uses. For example, a tenant may have deployed software on the tenant's data center resources. In this example, should the software have errors and behave incorrectly, the incorrect behavior may be evident in the growth data. For example, the growth data may show a sudden spike in the usage of a resource. Software or users that are behaving maliciously may also be detectable through the growth data.

FIG. 1 illustrates an example of a data center 104 that includes an analysis system 120 that can determine future resource needs for tenants of the data center 104. In various examples, a data center is a pool of computing resources, including processing resources, storage resources, networking resources, software resources, and so on. To provide the resources, the example data center 104 can include computing servers that have one or more central processing units (CPUs) for providing processing capacity, hard drives of various types for providing storage capacity, and network connections that connect the servers to each other and to networks outside the data center 104. The computer servers can further be executing software programs that enable tenants to use the hardware resources of the data center 104, and/or software programs than can be offered as resources. For example, the servers can be executing operating systems, hypervisors, virtual machines, web hosting platforms, software development platforms, networking platforms, and so on. In various examples, the operators of the data center 104 can be operating multiple data centers. In these examples, the data center operator may use the resources of multiple data centers as a common pool of resources, and can allocate resources from different data centers to the same tenant.

In some examples, the data center operator may be a cloud services provider, and may be leasing hardware and/or software resources to customers or tenants. In some examples, a customer or tenant can itself be a cloud services provider. For example, a first tenant can obtain resources from the data center 104, and then provide services, such as web hosting or software development platforms, to others, who become tenants of the first tenant. In some examples, the operator of the data center 104 may use the resources of the data center 104 partially or entirely for the operator's own uses. In the example of FIG. 1, the resources of the data center 104 are made available to others.

Tenants of the data center 104 can include organizations and/or individual users. An organization is a collection of individuals working together for a common purpose. Examples of organizations include companies, educational institutions, and governments, among others. The individuals of an organization can be represented in a computing environment as users, where a user is a digital entity represented by a user identifier, user account, authentication credentials, and/or access privileges, among other things. Herein, the terms user, user identifier, and user account may be used interchangeably. An organization can be represented in a computing environment by the users of the organization and/or the computer resources that are under the control of the organization. For example, an organization may operate and control a network and/or may own a public network domain, such as "Oracle.com."

A tenant that is an individual user is a digital entity that is not affiliated with any specific organization. For example, an individual can become a tenant of the data center 104 in order to operate a website.

Operation of the data center 104 of FIG. 1 differs from operation of what is commonly referred to as an enterprise network in several key aspects. An enterprise network, which may also be referred to as a corporate network, is the network infrastructure maintained and controlled by an organization and that connects computer devices and related devices of the organization together. Though the term "enterprise" is synonymous with the term "company," the network of, for example, a university of a government agency can also be considered an enterprise network. An enterprise network is often only accessible to the users of the organization that controls the enterprise network. Maintenance and administration of an enterprise network is most often handled by or under the direction of users of the organization.

In contrast, a data center such as the example data center 104 of FIG. 1 is operated by one organization for the use of other organizations or users. The organization that is the operator of the data center 104 controls and maintains the data center 104. In various examples, the organizations that are tenants of the data center 104 do not have direct access to the hardware of the data center 104, and need not be concerned with the maintenance of the data center 104. For security reasons, tenants of the data center 104 are also not aware of one another, and are not given overlapping resources. The data center 104 can thus enable organizations and individual users to obtain computing resources more quickly and efficiently than when the organizations and users operate a network themselves. Enabling multiple, unrelated tenants to use the resources of the same data center 104, can lead to technical issues for the data center operator, some of which are discussed further below.

In various examples, each tenant of the data center 104 receives a storage allocation, where the storage allocation includes the resources assigned to the tenant. For example, in the example illustrated in FIG. 1, a tenant, Tenant-0 102, has been allocated one storage allocation 110. Tenant-0 102 can be using the storage allocation 110 to run various services. For example, Tenant-0 102 can be using the storage allocation 110 to run a Load Balancing as a Service (LBaas) service, a Tenant Administration Service, and/or an Identity Cloud Service, or another service. These example services are services that can be offered to other tenants of the data center 104.

In the illustrated example, the resources in the storage allocation 110 are organized into functional entities 112, logical entities 114, and physical storage 116, each of which represent a different view of the same resources. For example, the functional entities 112 represent an abstract view of the resources, while the physical storage 116 represent a more literal view of the resources.

The functional entities 112 provide Tenant-0 102 with a functional view of the resources allocated to Tenant-0 102, where the functional view can be defined according to the service for which Tenant-0 102 is using the storage allocation 110. Functional entities can include various types of data structures, digital collections of data, or other structures that provide an abstract representation of data arranged in the logical entities 114 and stored in the physical storage 116. For example, if Tenant-0 102 is using the storage allocation 110 to operate a banking service, the functional entities 112 can include user identifiers, accounts of various types, and financial instruments such as loans, lines of credit, and certificates of deposit, among other things. As another example, if Tenant-0 102 is using the storage allocation 110 to operate an online store, the functional entities 112 can include products, departments, customer accounts, supplier accounts, email accounts, and a fulfillment system, among other things. In various examples, a data model can define the new functional entities 112, where the data model can be associated with a service for which Tenant-0 102 is using the storage allocation 110.

In some examples, the functional entities 112 can be defined by Tenant-0 102, and in some examples the service for which Tenant-0 102 is using the storage allocation 110 can define the functional entities 112. For example, Tenant-0 102 may be have configured the storage allocation 110 as a compute farm, on which the tenant's users can execute processing-intensive computations. In this example, the functional entities 112 associated with the compute farm service can include virtual machines, virtual processors, and virtual network connections, among other things. As a further example, Tenant-0 102 may also have subscribed to a load balancing service, which can distribute incoming compute requests among the available virtual machines, virtual processors, and virtual network connections. The load balancing service of this example can be provided by the data center 104 as a separate service, or can be provide by another service provider. In this example, functional entities 112 can be defined by the load balancing service to include service logs, routing requests, one or more routing hosts, Doman Name Service (DNS) activity, and other load balancing activity or records. The service logs can provide Tenant-0 102 with a history of routing requests, where the routing requests list processing jobs, when the processing jobs were initiated, where the processing job was executing, and when the processing job completed, among other things. A routing host can represent a virtual routing agent that manages the sending of processing jobs to virtual machines. DNS activity can record domain name service requests by network devices connecting to the virtual compute farm.

Another example of a service that can define functional entities 112 for the storage allocation 110 is a tenant administration service, an IaaS-type service that can orchestrate between an organization's workflows and the available resources in the storage allocation 110. For example, the tenant administration service can generate a service instance for a workflow, and can link the instance to resources such as computing resources, credentials, storage volumes, and networks, among other things. In this example, the tenant administration service can define functional entities such as service instances and user accounts that enable access to the resources of the storage allocation 110.

In various examples, the functional entities 112 map to logical entities 114. The logical entities 114 include various data structures that can be used to store and organize the data associated with each of the functional entities 112. An example of a logical entity is a database. In various examples, the logical entities 114 can include one or more databases that store the data for the functional entities 112. For example, one database can store user identifiers and user credentials, and another database can store user activity logs. In various examples, one database can store information of different types. In various examples, the same data can be stored in different databases, where the different databases are organized to access the data in different ways.

In various examples, a database can include one or more logical storage units that can be referred to as table spaces, where the table spaces store all of the database's data. In some examples, table spaces can be grouped into units that can be referred to as shards. A shard can be a category of the database. In some examples, a shard has physical storage space that is separate from other shards.

The table spaces can be divided into logical units of storage that can referred to as segments. A segment can include one or more logical units referred to as extents. An extent is a logical unit of database storage space allocation, and have a specific data structure. In some examples, all of the extents of a segment are stored in the same table space. As an example, a table's data can be stored in one segment, while the table's indexes can be stored in a different segment. When a table or index is partitioned, each partition can be stored in a separate segment. In some examples, additional extents can be allocated to a segment when all of the space in the extents of a segment are full. In these examples, because extents are allocated as needed, the extents of one segment may or may not be contiguous on a physical disk.

In various examples, extents are a collection of contiguous data blocks. A data block corresponds to a specific number of bytes of physical space on a disk. For example, a data block can be 8 kilobytes (KB), 16 KB, or some other amount of physical storage. A data block can be stored on disk in a data file, where the format of the file can depend on the operating system or file system that manages the disk. In some examples, when a new extent is allocated to a segment, corresponding data blocks may not be immediately allocated. Instead, data blocks may be allocated as the space in the segment fills. In various examples, a database can be enlarged by either: adding a new table space; adding a data file to a table space; or increasing the size of an existing data file.

In some examples, a database object, such as a table, an index, or a large object, may be stored in one or more table spaces, and may span multiple data files. In some examples, database administration programs specify operations on the database in terms of database objects rather than using the names of data files.

In the preceding examples, table spaces, segments, extents, and data blocks are each examples of different types of logical entities. Data blocks can also be referred to as logical blocks or pages. The preceding examples provide one example organization for a database, and other organizations are possible.

In various examples, the logical entities 114 map to physical storage 116. The physical storage 116 includes hard drives and other non-volatile memory devices. For example, as noted above, a database can include one or more table spaces, and a table space can be divided into segments. A segment can be divided into extents, where an extent is a collection of contiguous data blocks. The data blocks can be stored in data files on a physical disk. The size of a database, in terms of storage space on disk, can thus be a sum of the data files that make up all of the table spaces.

In various examples, Tenant-0 102 can be allocated more than one storage allocation in the data center 104. In these examples, Tenant-0 102 can use more than one storage allocation for one service, and/or can use each storage allocation for a different service. In some examples, Tenant-0 102 can be allocated storage allocations in different data centers.

In various examples, use of the storage allocation 110 by Tenant-0 102 is based on a subscription. For example, an organization can pay the data center operator for use of the storage allocation 110, and in exchange can use the storage allocation 110 for a prescribed period of time. In this example, at the end of the prescribed period of time, Tenant-0 102 can cease use of the storage allocation 110, or can renew the subscription. In various examples, a contract can define the fee, the subscription period, the use to which Tenant-0 102 can put the storage allocation 110, and/or the services to be provided by the data center 104 in exchange for the fee, among other things. In some example, the contract can define minimum service levels the data center 104 must guarantee to Tenant-0 102, such as available physical resources (e.g., storage or processing capacity) or network bandwidth, among other things.

In various examples, Tenant-0 102 can view and manage the storage allocation 110 through a user interface 106 provided by the data center 104. In some examples, the user interface 106 provides an interface for all the storage allocations in the data center 104 that are assigned to Tenant-0 102. When Tenant-0 102 has storage allocations in multiple data centers, in some examples, the user interface 106 can provide one view of all the storage allocations, including storage allocations in different data centers. Tenant-0 102 would not, however, view the storage allocations of other tenants. In various examples, authentication credentials can be required for Tenant-0 102 and/or users of Tenant-0 102 to access the user interface 106.

In various examples, the user interface 106 can enable Tenant-0 102 to configure the storage allocation 110. Configuring the storage allocation 110 can include, for example, defining the functional entities 112 and types of data associated with each functional entity. Thereafter, Tenant-0 102 can use the user interface 106 to conduct administrative operations for the storage allocation 110, such as generating new functional entities 112 and assigning functional entities 112 to users. In some examples, the users of Tenant-0 102 can access the resources of the storage allocation 110 through the user interface 106. In some examples, the users can access the resources over a network, without needing to use the user interface 106. For example, the data center 104 can provide an Application Programming Interface (API) or another interface that can enable network-capable computing devices to connect to the data center 104.

In various examples, the data center 104 can include a separate developer user interface 108, which the data center operator can use to manage the data center 104. The developer user interface 108 can, for example, provide operations personnel, who may be referred to as development and operations or "devops," with the status of the computer servers in the data center 104, the load on each server, the current storage capacity of each server, and possibly also the processes running on each server. As a further example, the developer user interface 108 may be able to provide a listing of current tenants, a service category for each tenant, resources currently assigned to each tenant, and current utilization of those resources among other things.

The example data center 104 of FIG. 1 further includes automated management features, which can assist in the management of the resources of the data center 104. The automated management features include a provisioning system 130, life cycle management 150, and an analysis system 120.

In various examples, the provisioning system 130 can manage onboarding of new subscriptions and/or renewal of existing subscriptions. Onboarding includes handling requests for new subscriptions and setting up storage allocations from pre-allocated bundles of resources. New subscription requests can come from new tenants or from existing tenants. Renewing existing subscriptions may require only informing a tenant that the subscription period for a storage allocation is ending, and starting a new subscription for the storage allocation. Renewing an existing subscription can, alternatively or additionally, include reconfiguring an existing storage allocation and/or migrating an existing storage allocation to a new storage allocation. In various examples, the operations of the provisioning system 130 are mostly or fully automated, and may require little to no assistance from human administrators. Onboarding and renewals is discussed further below.

In various examples, the life cycle management 150 can manage recycling of physical storage in active storage allocations. Recycling of physical storage can include deleting certain data at certain times, which frees space in the physical storage and makes the space available for new data. In some examples, part of the service provided by the data center 104 can include automated deletion of data that is older than a certain period. For example, some data may become duplicated over time, or may become stale or out of date. In some examples, the tenant may be able to specify data that the tenant does not want kept past a certain date, which the life cycle management 150 can then delete when the date is reached. Alternatively or additionally, the tenant may be able to specify data that should not be automatically deleted. Further examples of the life cycle management 150 are discussed below.

In various examples, the analysis system 120 can collect information about active storage allocations, and can output a prediction of future resource needs of each storage allocation, and/or of all the storage allocations, as a whole. The output of the analysis system 120 is referred to herein as growth data. The process of determining growth data can include identifying functional entities, determining the mapping of functional entities to logical entities, determining the mapping of logical entities to physical storage. The process can further include monitoring changes over time to the functional entities, logical entities, and physical storage. The process can further include performing statistical analysis using the data produced by the monitoring to determine how many more functional entities, logical entities, and/or how much more physical storage the storage allocation will need in the next week, month, year, or some other future time period.

In various examples, the growth data produced by the analysis system 120 is consumed by various other systems in the data center 104. For example, the growth data can be provided to the user interface 106 for viewing by the tenant. In this example, the tenant can be provided with a projection of how many more functional entities the tenant may need in the future, and/or how much more physical storage the tenant may need. As another example, the growth data can be provided to the developer user interface 108 for viewing by the data center operator. In this example, the data center operator can use the data to plan future expansion of the resources of the data center 104. As another example, the growth data can be provided to the provisioning system 130, which can use the growth data to more efficiently allocate the data center's resources when onboarding new subscriptions or renewing existing subscriptions. As another example, the life cycle management 150 can use the growth data to modify the rate at which data is recycled, and to otherwise make more intelligent decisions about reclaiming space in a storage allocation. The growth data can also be provided to other systems 160, such as security analytics systems.

Figure 2:
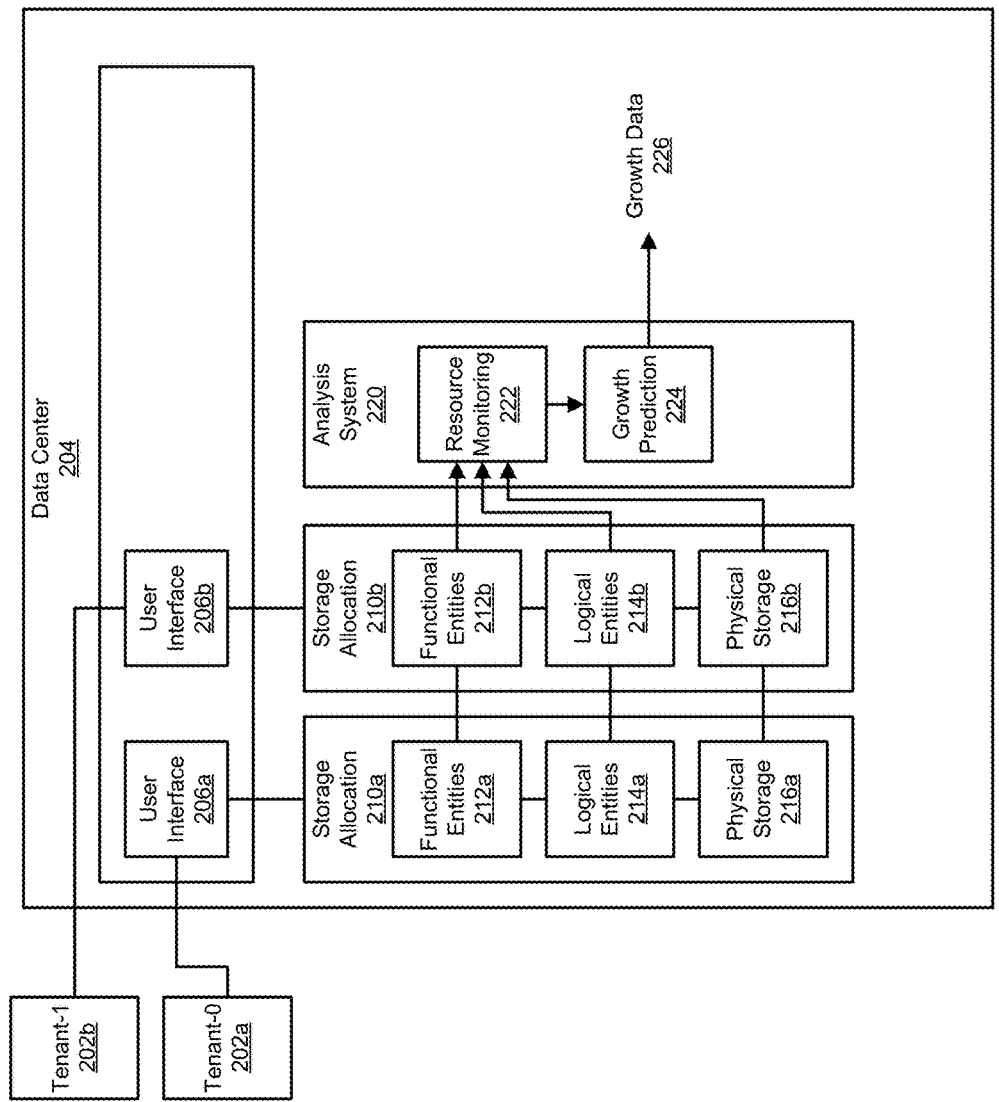
FIG. 2 illustrates an example of the operation of an analysis system in a data center.

FIG. 2 illustrates an example of the operation of an analysis system 220 in a data center 204. In this example, a first tenant, Tenant-0 202a, is using the resources of a first storage allocation 210a for one or more services. For example, Tenant-0 202a can be using the first storage allocation 210a to run an online banking service. The first storage allocation 210a includes functional entities 212a, which can be defined by Tenant-0 202a, and/or data center 204. The functional entities 212a map to various logical entities 214a in the first storage allocation 210a, which provide data structures for storing and organizing data associated with the functional entities 212a. The logical entities 214a map to physical storage 216a in the first storage allocation 210a, which can include data files on physical disks. In some examples, Tenant-0 202a may have more than one storage allocation in the data center 204, being used for the same services or different services. In various examples, Tenant-0 202a can view and manage the first storage allocation 210a (and possibly also any other storage allocation) through a user interface 206a provided by the data center 204.

The example of FIG. 2 further illustrates a second tenant, Tenant-1 202b. Tenant-1 202b can be associated with the same organization as Tenant-0 202a. For example, Tenant-0 202a can be one division of a company, and Tenant-1 202b can be a different division of the same company. Tenant-1 202b can alternatively be part of an organization that is unrelated to Tenant-0 202a. For example, Tenant-0 202a can be associated with a national bank, while Tenant-1 202b be a business run by a sole proprietor.

In the example of FIG. 2, Tenant-1 202b is using the resources of a second storage allocation 210b. The second storage allocation 210b includes functional entities 212b, which can be similar to the functional entities 212a of the first storage allocation 210a, or can be entirely different. For example, while Tenant-0 202a can be using the first storage allocation 210a to run an online banking service, Tenant-1 202b can be using the second storage allocation 210b to run a website that advertises the goods and services sold by the organization with which Tenant-1 202b is associated. The functional entities 212b of the second storage allocation 210b also map to logical entities 214b, which further map to physical storage 216b. Tenant-1 202b can be provided with a different instance of a user interface 206b to view and manage the second storage allocation 210b. The instance of the user interface 206b provided to Tenant-1 202b can be similar to the user interface 206a provided to Tenant-0 202a, may include features or functionality available not to Tenant-0 202a, and/or may not have all of the features or functionality available to Tenant-0 202a.

In various implementations, the analysis system 220 can monitor the storage allocations in the data center 204, and, using data produced by monitoring the storage allocations, predict the future growth of the storage allocations. In some examples, the analysis system 220 can include resource monitoring 222 and growth prediction 224 systems. The resource monitoring 222 and the growth prediction 224 can be executed, for example, by software executing autonomously on a compute server in the data center 204.

In various implementations, the analysis system 220 can operate in stages. For example, in a first stage, the analysis system 220 can determine the mapping of functional entities to logical entities, and the mapping of logical entities to physical storage. As a further example, in a second stage, the analysis system 220 can track changes to the functional entities, logical entities, and physical storage. As a further example, in a third stage, the analysis system 220 can conduct various statistical analysis to predict the future needs, in terms of functional entities, logical entities, and/or storage, each storage allocation may need, and/or that the data center 204 as a whole may need. In various examples, these example stages may be divided into further stages. In various examples, operations of the analysis system 220 can include additional stages.

In various implementations, a first operational stage of the analysis system 220 includes mapping the relationships between functional entities, logical entities, and physical storage. These relationships may not otherwise be available. For example, a data model may define the functional entities for a storage allocation, and that each functional entity is provided with a certain amount of storage. For example, the data model may specify that, for a functional entity such as a user account, the functional entity is associated with one gigabyte (GB) of storage space. The data model, however, may not describe a mapping of the functional entity to logical entities. For example, the data model may not indicate the table spaces, table indexes, and/or table records into which the data for a user account is organized. Having this relationship may be necessary for understanding future physical storage needs, because, for example, the manner in which a database grows may dictate the way in which physical storage is allocated to accommodate the growth. For example, as provided by the examples discussed above, a database may grow by adding extents, and the size of the extents and/or the need for adding extents can be dependent on the part of the database that needs more data. Thus having only the relationship between a functional entity and the amount of storage allocated to the functional entity may not provide enough information to predict the future storage needs for the functional entity.

Management of the logical entities might be an automated operation, handled by the database software, and thus the organization of the logical entities may not be information that is readily available. The mappings of functional entities to logical entities, and logical entities to physical storage may, additionally, change over time as data is deleted and added. In some examples, the data model is a static description, and may not reflect the utilization of new functional entities or physical storage at any given time, or over a span of time.

The mapping data, however, when used to monitor the storage allocations, can provide a more comprehensive and accurate view of the tenant's use of resources. For this and various other reasons, the analysis system 220 can map a storage allocation to discover the relationships between functional entities, logical entities, and physical storage. For example, the analysis system 220 can examine the structure of a logical entity such as a database, and identify the functional entity or entities associated with each database entry. For example, a database entry may include a tag or a pointer to a functional entity, or to a functional entity that is part of another functional entity (e.g., a user account that is one of multiple user accounts associated with the same user identifier). In this example, the analysis system 220 can generate a data structure that stores any relationships between functional entities, and between functional entities and the logical entities into which the functional entities are organized.

As a further example, the analysis system 220 can determine the data files in which each of the logical entities are stored. This information can be derived, for example, by examining the extents of a database, and determining the data files into which the data blocks of each extent are stored. A data block in an extent may identify a data file in which the data block is stored.

In various examples, the analysis system 220 can construct a data structure in which the analysis system 220 can store a mapping of functional entities to logical entities, and logical entities to physical storage. The data structure can be, for example, a multi-tiered associative array or a similar data structure. In some examples, the analysis system 220 maintains a separate mapping for each storage allocation.

In various implementations, in a second operational stage, the analysis system 220 can monitor changes to the functional entities, logical entities, and physical storage in the storage allocations. Monitoring can be conducted by the resource monitoring 222 of the analysis system 220. Changes can include increases or decreases in a number of functional entities or logical entities being used, and/or increases or decreases in an amount of physical storage being used. For example, the analysis system 220 can monitor the number of functional entities 212a, such as user accounts, allocated to the first storage allocation 210a, and the number of functional entities 212a actually being used at any given time. As another example, the analysis system 220 can maintain a count of table spaces, segments, extents, and/or data blocks included in the logical entities 214a at any point in time. As another example, the analysis system 220 can determine the amount of physical storage 216a in use in any given time versus the total physical storage 216a allocated to the first storage allocation 210a.

In various examples, the analysis system 220 can monitor changes to the first storage allocation 210a and the second storage allocation 210b over a period of time. For example, the analysis system 220 can monitor the storage allocations for one week, one month, six months, a year, or some other time period. During this period, the analysis system 220 can conduct a count of functional entities, logical entities, and/or physical storage once an hour, every four hours, once a day, or at some other interval.

In various implementations, in a third operational stage, the analysis system 220 can analyze data collected during monitoring of the storage allocations, and can output a prediction of the future growth of the storage allocations. The predicted future growth is referred to herein as growth data 226. The growth data 226 can be determined by the growth prediction 224 of the analysis system 220. In various examples, the growth data 226 can be output using well-known formats, which can enable different systems in the data center 204 to easily consume the growth data 226. For example, the growth data 226 can be output using JavaScript Object Notation (json), eXtensible Markup Language (XML), or another portable format.

In some examples, the growth data 226 includes expected growth for each of the storage allocations. In these examples, the growth data can include future functional entity needs, future logical entity needs, and/or future physical storage needs. In some examples, the growth data 226 for a storage allocation can separate report future needs for different services for which a tenant is using a storage allocation. For example, if Tenant-0 202a is using the first storage allocation 210a to provide an online banking service, and Tenant-0 202a is also subscribing to an identity management service, the growth data 226 can predict the number of bank accounts the banking service may need in the next year, and separately predict the number of user accounts the identity management service may be managing in the next year.

In some examples, the growth data 226 predicts future resource needs across storage allocations. For example, the growth data 226 can predict future resource needs for storage allocations of different types. For example, the first storage allocation 210a and the second storage allocation 210b can both be storage allocations of type "A," in which case analysis system 220 can use monitoring data from both storage allocations to predict future resource needs for all storage allocations of type "A."

In some examples, the growth data 226 can predict future resource needs for the data center 204 as a whole. For example, the growth data 226 can include future compute resources needs, future disk space needs, and/or future network capacity needs.

In some examples, the analysis system can use linear regression models to predict future growth. Linear regression attempts to model the relationship between two variables by fitting a linear equation to observed data. One variable is considered the explanatory, or independent variable, and the other is considered to be a dependent variable.

In some examples, the analysis system can use a tool such as the programming language R to perform linear regression modeling. R provides a language and environment for statistical computing. For example, R includes a function lm( ) for fitting linear regressions, which uses a formula syntax to specify the form of the statistical model to be fit. That is, for a linear model regressing Y on X, can be expressed as lm(Y~X), where the tilde is read as "is a modeled as a function of." Using this function, database storage needs, for example, can be modeled as a function of, for example, functional entities.

Figure 3:
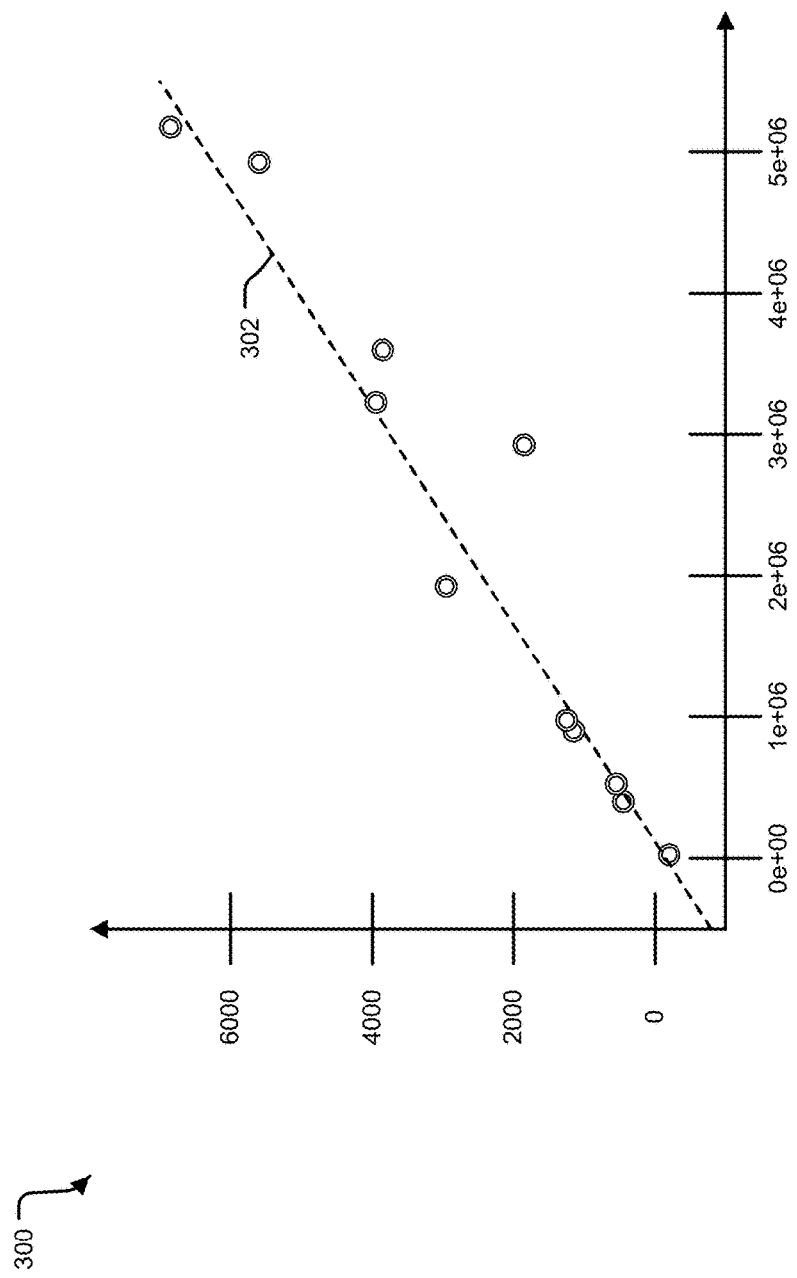
FIG. 3 includes a chart illustrating an example of linear modeling applied to data captured for an identity management service.

FIG. 3 includes a chart 300 illustrating an example of linear modeling applied to data captured for an identity management service. In this example, the identity management service is providing identity management for tenants in a data center. During a monitoring period, the identity management service was servicing 225 tenants, and the analysis system counted audit events for each tenant. Audit events, in this example, are a type of functional entity. The horizontal axis of the chart 300 of FIG. 3 represents audit event counts, in thousands. The analysis system 220 also recorded the size of the audit database, which is a logical entity in this example. The vertical axis of the chart 300 represents the audit database size, in megabytes. In the chart 300, data points that were collected are illustrated by dots.

In the chart 300 illustrated in FIG. 3, a dashed line 302 illustrates a simple linear regression model applied to the data. The dashed line 302 represents a best-fit between the data points on the chart 300, and can be expressed using the following equation:

$$y = b_0 + b_1 x_1$$

In the preceding equation, the term $b_0$ is the vertical intercept of the dashed line 302, and the term $b_1$ is the slope of the dashed line 302. The term $x_1$ is an independent variable; for example, in the chart 300, the term $x_1$ represents a data count for a functional entity. The term y is a dependent variable; for example, in the chart 300, the term y represents storage consumption for a functional entity. As an example, in the chart 300, the dashed line 302 intersects the vertical axis at $b_0$=112.9, and the slope of the dashed line 302 is $b_1$=0.001306. In this example, values for y can be projected for future values of $x_1$. That is, for future counts of audit events $x_1$, the storage needed for the audit counts can be determined by computing y=112.9+(0.001306)($x_1$).

Figure 4:
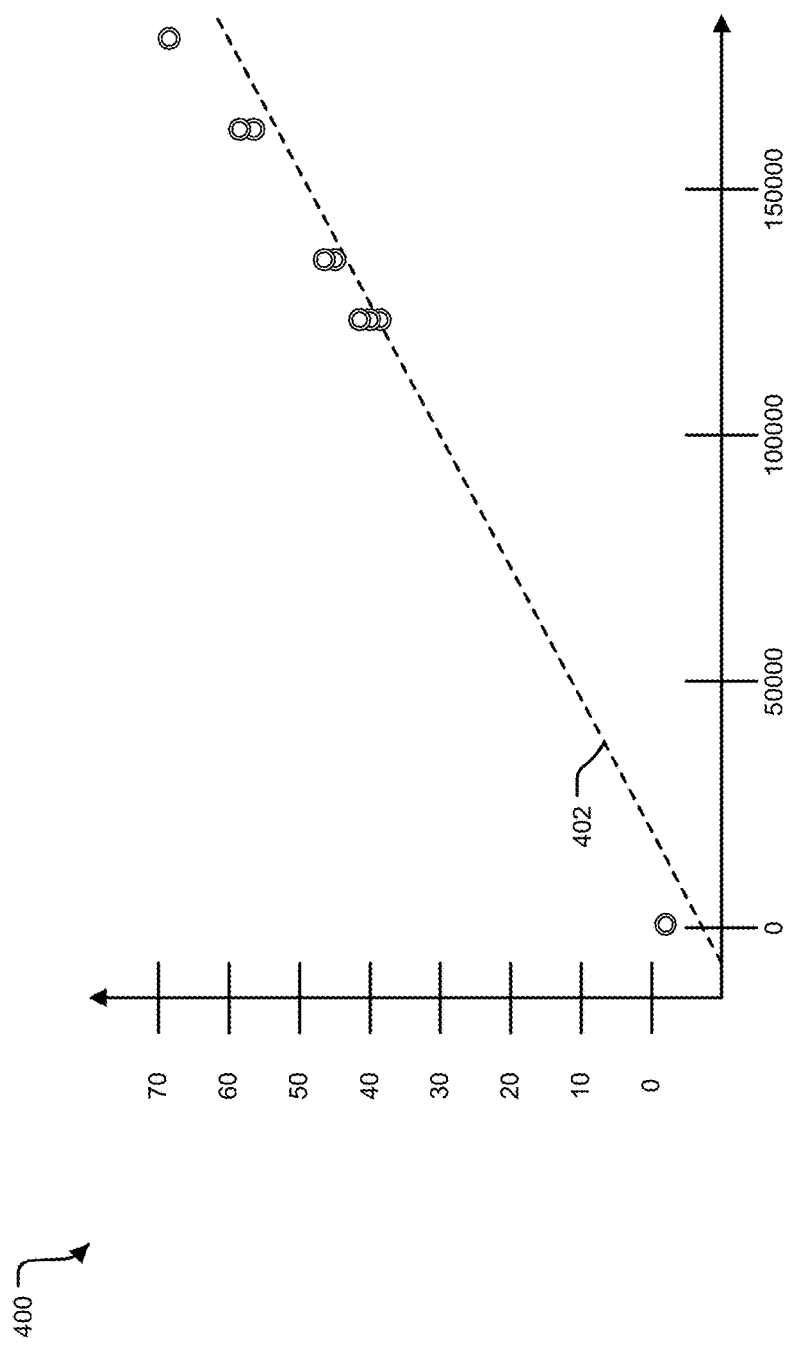
FIG. 4 illustrates another example of application of linear modeling to predict future growth.

FIG. 4 illustrates another example of application of linear modeling to predict future growth. FIG. 4 includes a chart 400 illustrating data captured for an identity management service. In this example, the analysis system has counted user identities and storage used by each user identity. In the chart 400, the horizontal axis represents counts of user identities, and the vertical axis represents storage occupied by user identities, in megabytes. In this example, user identities are a type of functional entity, and the storage occupied by the user identities are a type of logical entity. As in the preceding example, the 225 tenants were monitored during the monitoring period. Data points captured by the analysis system are illustrated by dots.

In this example, a dashed line 402 illustrates a best-fit between the data points. The dashed line 402 can also be expressed by the equation discussed above. In this example, the dashed line 402 intercepts the vertical axis at $b_0$=−1.527, and the slope of the dashed line 402 is $b_1$=0.003396. In this example, for a future number of user identities $x_1$, the storage needed for this number of user identities can be determined by computing y=−1.527+(0.003396)($x_1$).

In various examples, data can be captured across multiple dimensions. For example, storage consumption, in terms of database tables, indexes, partitions, unstructured binary data, and so on, can be mapped to functional entities, functional entity states, time, and so on. In these and other examples, forecasting can be conducted for different factors, in addition to or instead of entity growth. For example, forecasting can be conducted using time and as the independent variable.

Multi-dimensional linear regression can be used to predict future resource needs that are based on multiple factors. For example, the linear regression function lm( ) of the language R can be used to model, for example storage needs as a function of multiple, independent variables, such as a number of users, a number of applications, or a count of authorization tokens, among other things. That is, in lm(y~x+users+applications+authorization tokens), y can represent storage needs, x can represent counts of functional entities, with users, applications, and authorization tokens provided as examples of functional entities.

Linear regression modeling is one example of a technique that can be used to forecast resource needs based on past resource usage. Other statistical analysis techniques can be used, such as, for example, population mean, population standard deviation, population variance, sample mean, sample standard deviation, sample variance, and pooled sample standard deviation, among others.

Various systems in a data center can make use of the growth data produced by an analysis system such as is described above. A provisioning system is one example of a system in a data center that can consume the growth data.

Figure 5A:
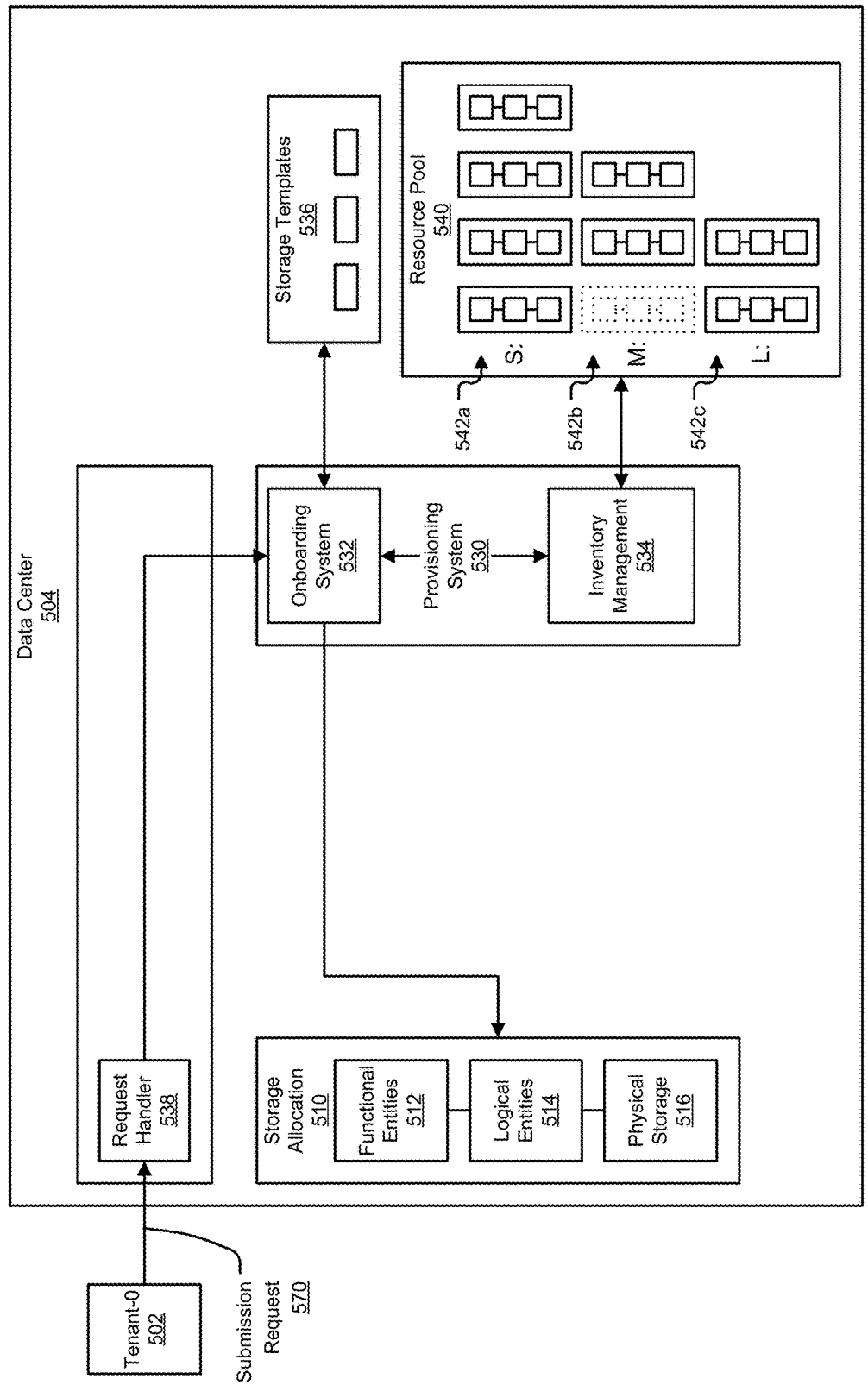
FIGS. 5A and 5B illustrate examples of operations of a provisioning system in a data center, and use by the provisioning system of growth data computed by an analysis system.
Figure 5B:
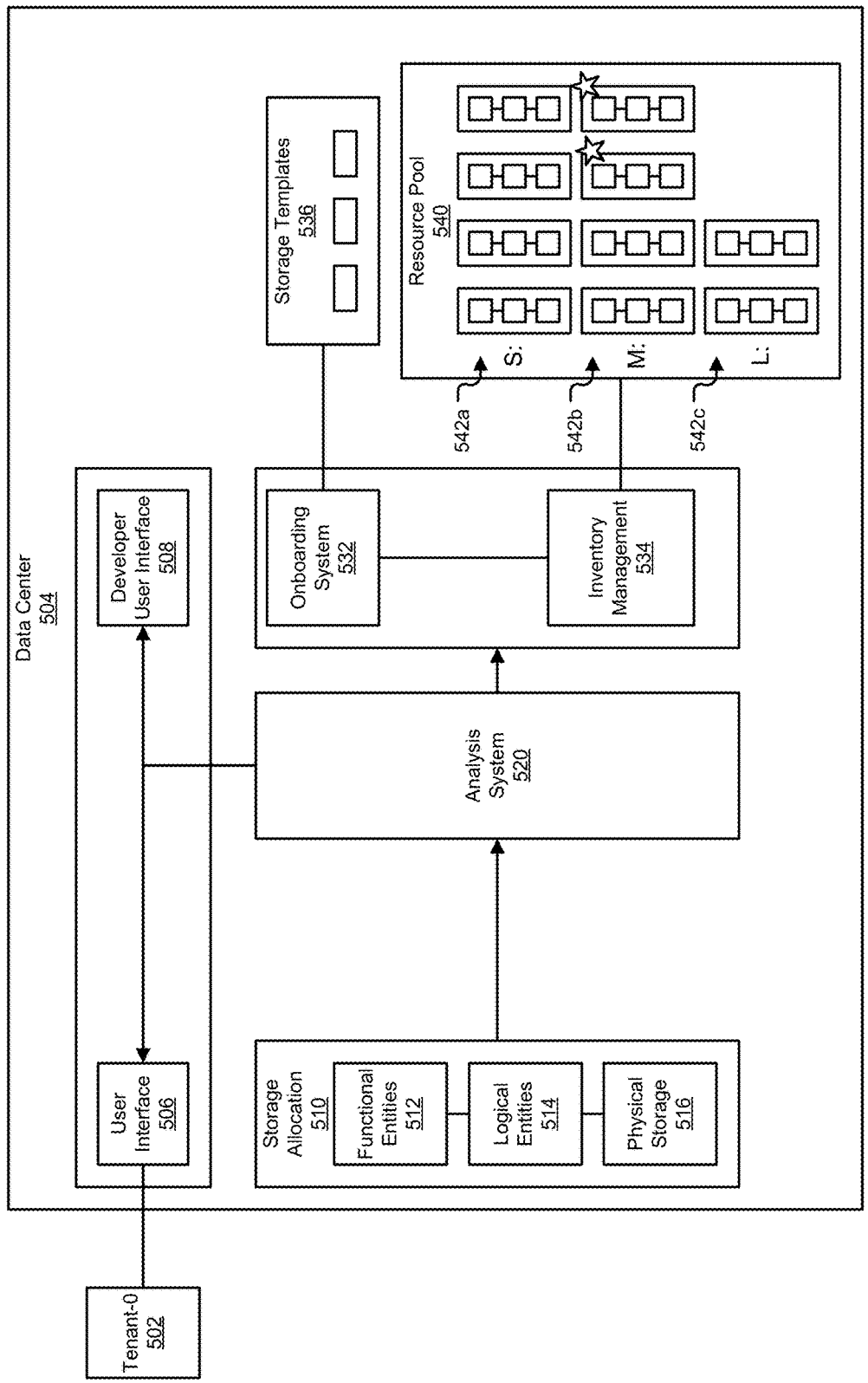

FIGS. 5A and 5B illustrate examples of operations of a provisioning system 530 in a data center 504, and use by the provisioning system of growth data computed by an analysis system 520. In the example illustrated in FIGS. 5A and 5B, the data center 504 receives new submission request 570 for a new storage allocation. The submission request 570 is received from a tenant, Tenant-0 502, which can be an existing tenant of the data center 504, or can be a new tenant.

In various examples, the data center 504 receives the submission request 570 at a request handler 538. The request handler 538 can be an automated system that communicates with Tenant-0 502 to determine the tenant's needs and to establish a service contract with Tenant-0 502. For example, the request handler 538 can present a set of questions to Tenant-0 502, which, when answered by the tenant, can indicate the service or services for which Tenant-0 502 intends to use a storage allocation. In various examples, the request handler 538 can use this information to determine a category for the tenant's subscription. In some examples, the provisioning system 530 determines the subscription category, and communicates this information to the request handler 538. The category can determine the parameters of the service contract, including, for example, the size of the storage allocation given to Tenant-0 502, as discussed further below. The service contract can further specify parameters such as a term for the subscription (e.g., six months, one year, three years, or some other time period), service levels the data center 504 will provide (e.g., minimum compute, storage, and networking services), life cycle management parameters, and other terms. In various examples, communication with Tenant-0 502 occurs through a series of screens presented using a user interface, such as a web browser, and can occur without assistance from a human operator.

Once Tenant-0 502 has consented to the service contract, the request handler 538 can communicate to the provisioning system 530 that a new subscription has been received. In various implementations, the provisioning system 530 can include an onboarding system 532 that manages the configuration of new storage allocations and inventory management 534 that manages a pre-allocated resource pool 540. In some examples, the operations of the onboarding system 532 and the inventory management 534 are conducted by one compute server executing administrative tasks.

In various examples, the onboarding system 532 is an automated system that uses the category for a new subscription to configure a new storage allocation 510. The onboarding system 532 can be, for example, software executing on compute server that has been dedicated to administrative tasks. The onboarding system 532 can have access to a set of storage templates 536. The storage templates 536 can include one or more templates for each subscription category, where a template can provide information such as a size for the new storage allocation 510, a description of functional entities 512 that can be defined for the storage allocation 510, an organization of the logical entities 114 for the storage allocation 510, the size of physical storage 516 for the storage allocation 510, services for which the storage allocation 510 can be used, and/or services that can be activated for the storage allocation 510 by the tenant. As an example, the storage templates 536 can include one set of templates each for categories "small," "medium," and "large," where these categories describe an approximate size of the resources to which a tenant is subscribing. As an example, the storage templates can describe an amount of physical storage and/or the size of the table spaces that a tenant of a particular category will receive. In the example illustrated in FIG. 5A, the new subscription from Tenant-0 502 has been classified as a "medium" category subscription.

Once the onboarding system 532 has identified a storage template for the new subscription, the onboarding system 532 communicates this information to the inventory management 534. In various examples, the inventory management 534 is an automated system that manages a resource pool 540 of the data center 504. The inventory management 534 can be conducted by, for example, software executing on a compute server in the data center 504.

The resource pool 540 includes the hardware and software resources of the data center 504 that are not currently in use by tenants. In various examples, these resources are organized into pre-allocated bundles of resources. Pre-allocated, in this context, means that a bundle of resources includes a certain amount of physical storage that has been assigned to the bundle of resources. This physical storage is not available to other bundles of resources, or to active storage allocations. In some cases, a bundle of resources can also include pre-configured logical entities, such as some basic database structures loaded onto the physical storage. A bundle of resources can also include some pre-configured functional entities, or may include no functional entities.

In various examples, different bundles of resources can be pre-allocated for different categories of subscriptions. For example, in the example illustrated in FIG. 5A, the resource pool 540 includes bundles of resources 542a for the "small" category, bundles of resources 542b for the "medium" category, and bundles of resources 542c for the "large" category. In this example, the bundles of resources 542a for the "small" category include fewer resources than the bundles of resources 542b for the "medium" category, which in turn includes fewer resources than the bundles of resources 542c for the "large" category. For example, the bundles of resources 542a for the "small" category can each include 11 GB of physical storage, the bundles of resources 542b for the "medium" category can each include 31 GB of physical storage, and the bundles of resources 542c for the "large" category can each include 51 GB of physical storage. Within each category, the bundles of resources can otherwise be the same or have some variations, such as having logical and/or physical entities preconfigured.

Pre-allocating bundles of resources enables the provisioning system 530 to quickly convert a bundle of resources into an active storage allocation. For example, in the example illustrated in FIG. 5A, having been provided with a storage template for the "medium" category, the inventory management 534 can select a bundle of resources from the resource pool 540 from the bundles of resources 542b for the "medium" category. The inventory management 534 can indicate the selection to the onboarding system 532, which can configure the selected bundle of resources into the new storage allocation 510. Because the selected bundle of resources includes pre-allocated physical storage and possibly also some logical entities, the onboarding system 532 may only need to remove the bundle of resources from the resource pool 540, configure the data center's administrative systems to recognize the bundle of resources as a new storage allocation 510, and enable access to the storage allocation 510 by Tenant-0 502. In some examples, the onboarding system 532 can also configure some functional entities 512 for the storage allocation 510, and/or Tenant-0 502 can configure the functional entities 512.

The process of converting a bundle of resources into a new storage allocation can possibly be accomplished in a few minutes or in less than an hour or a few hours. Without the pre-allocated bundles of resources, activating a new storage allocation can require multiples of hours or possibly even days. This is because unused physical storage would need to be identified and allocated, then logical and functional entities would need to be configured on the physical storage. Even with automated systems, these steps can be time consuming. Pre-allocating bundles of resources can save the time needed to bring up a storage allocation, so that the tenant can put the storage allocation into use with very little delay after issuing the submission request 570.

The storage allocation 510 should provide Tenant-0 502 with sufficient resources for the subscription period. For example, if the storage allocation 510 includes 31 GB of physical storage 516 and the subscription period is one year, then Tenant-0 502 should not use up all 31 GB before the end of one year. The configuration of the bundles of resources in the data center 504, including the physical storage size for bundles of resources of different categories, may only be estimated by the data center operator. These estimates may be based on past information, and not include projected resources needs. Additionally, these estimates may not reflect actual usage of the storage allocations, or usage that was not contemplated when the estimates were made. For example, Tenant-0 502 may use up all 31 GB of physical storage 516 in six months.

In various implementations, the provisioning system 530 can use growth data output by an analysis system 520 to make adjustments to the storage templates and bundles of resources in the resource pool 540, to reflect future resource needs. As illustrated in FIG. 5B, once the new storage allocation 510 is active and being used by Tenant-0 502, an analysis system 520 can monitor the storage allocation 510 for changes to the functional entities 512, logical entities 514, and physical storage 516. Using data obtained from monitoring the storage allocation 510, the provisioning system 530 can predict the future resource needs of the storage allocation 510. As discussed above, the provisioning system 530 can obtain data from all the storage allocations in use in the data center 504 to determine growth data.

In various examples, the inventory management 534 can periodically replenish the resource pool 540, so that a certain number of bundles of resources are maintained. For example, the inventory in the bundles of resources can be replenished once per week, once per month, or over another time interval. In various examples, the number of bundles of resources maintained in the resource pool 540 is based on certain assumptions, such as, for example, the number of new subscriptions expected to be received in the next week, month, year, or some other time interval, and the categories that new subscriptions will fall into.

In various examples, adjustments the provisioning system 530 can make can include changing the size of the bundles of resources. For example, the inventory management 534 can be instructed to reduce or increase the size of the bundles of resources 542b for the "medium" category. Reducing the size of a bundle of resource can include deallocating physical storage from the bundle of resources, and putting the deallocated physical storage into a pool of available resources. Increasing the size of a bundle of resources can include adding physical storage from the pool of available resources to the bundle of resources. In some cases, the data center operator may need to add physical resources in order for any unallocated physical storage to be available. In some cases, changing the size of a bundle of resources can also include modifying the configuration of logical and/or physical entities in the bundle of resources.

Changes to the bundles of resources can reflect projected resource needs. For example, the storage allocation 510 assigned to Tenant-0 502 may have been from the bundles of resources 542*b* for "medium" category subscriptions, and may include 31 GB of physical storage 516. In this example, the growth data from the provisioning system 530 can indicate that Tenant-0 502 will need 50 GB by the end of the subscription period. Data from other storage allocations from the "medium" category can be aggregated, to determine that tenants using these storage allocations, on average, will be using 50 GB of storage by the end of a similar subscription period. This indicates that 50 GB is a better size for the bundles of resources in the "medium" category than is 31 GB. Thus, in this example, the inventory management 534 can increase the physical storage of the bundles of resources 542*b* in the "medium" category to 50 GB. In this example, future subscriptions for the "medium" category will be given storage allocations having 50 GB of physical storage, instead of 31 GB.

The growth data can indicate the future resource needs in several different ways. For example, the growth data can indicate the number of functional entities Tenant-0 502 will be using by the end of the subscription period. In this example, growth data can include the size of physical storage that corresponds to the number of functional entities. As another example, the growth data can indicate a number of table spaces Tenant-0 502 will be using, and an amount of physical storage that corresponds to the number of table spaces. In additional examples, future resource needs can be expressed in various combinations of functional entities, logical entities, and/or physical storage space.

As such, the storage templates 536 can also be adjusted to reflect future resource needs. For example, the storage allocation 510 may have come with fifty user accounts when first configured, and the growth data may indicate that Tenant-0 502 will be using 100 user accounts by the end of the subscription period. The same may be true for other tenants that were given a "medium" category storage allocation. In this example, the provisioning system 530, for example using the onboarding system 532, can adjust a storage template for "medium" category subscriptions to increase the number of user accounts that come with the subscription. In some examples, a change to the number of functional entities in a storage template can also include a change to the number of logical entities that correspond to the functional entities.

Adjustments the provisioning system 530 can make to the resource pool 540 can, alternatively or additionally, include change the number of bundles of resources for different categories. For example, the resource pool 540 may initially include four bundles of resources 542*a* in the "small" category, three bundles of resources 542*b* in the "medium" category, and two bundles of resources 542*c* in the "large" category. These quantities can reflect an expectation of the data center operator that most subscriptions will fall into the "small" category, that fewer will fall into the "medium" category, and fewer still will fall into the "large" category. The growth data from the analysis system 520, however, may indicate that most subscriptions will fall into the "medium" category. For example, the growth data may indicate that tenants given storage allocations in the "small" category will use about as many resources as do tenants using storage allocations in the "medium" category. In these example, the inventory management 534 can be instructed to increase the number of bundles of resources 542*b* maintained in the resource pool 540 for the "medium" category, so that these bundles of resource can be available for future subscriptions.

In various examples, the provisioning system 530 can also manage subscription renewals. For example, when Tenant-0 502 subscription for the storage allocation 510 is nearing the end of the subscription term, the data center 504 can send Tenant-0 502 an automated message asking Tenant-0 502 whether the tenant wishes to renew the subscription. If Tenant-0 502 does not renew the subscription, then the resources in the storage allocation 510 can be added back to the resource pool 540.

If Tenant-0 502 renews, then, in some implementations, the provisioning system 530 can determine whether the resources of the storage allocation 510 are adequate to meet the tenant's needs, or need to be increased. For example, the provisioning system 530 can use the growth data from the analysis system 520 to determine the tenant's future resource needs. The growth data can indicate, for the next subscription period, that the tenant's use of the storage allocation 510 will not exceed the current resources of the storage allocation 510. Alternatively, the growth data may indicate that the tenant will need additional resources, as well as how many additional resources the tenant will need. In this situation, the provisioning system 530 can provide the tenant with more resources than are currently available in the storage allocation 510.

Increasing the resources for an existing tenant can be accomplished in several different ways. In one example, the physical storage 516 of an existing storage allocation 510 can be increased. In this example, the additional physical storage 516 can be occupied over time, as more data is generated by the functional entities and/or the size of the logical entities increase. One advantage of increasing the physical storage 516 is that the storage allocation 510 may not need to be taken offline to do so, or may need to be taken offline for only a short period of time. A disadvantage of only increasing the physical storage 516 is that use of the physical storage 516 may be less efficient than when the physical storage 516 is allocated as part of a bundle of resource.

Another method of increasing the resources for an existing tenant is to promote the tenant to a different category, one that is associated with larger bundles of resource pool 540. In this case, the tenant can be assigned a new bundle of resources from the resource pool 540. The new bundle of resources may be larger due to the subscription having been upgraded to a larger category. Alternatively, the bundle of resources may be larger due to the size of the bundle of resources having been increased. In either case, the data in the existing storage allocation 510 can be migrated to a new storage allocation configured from the bundle of resources. Migrating the data can require taking the storage allocation 510 offline, which results in an interruption of service to the Tenant-0 502. Migrating the data to a new storage allocation can, however, result in the new storage allocation having a better organization, which can lead to more efficient use of the resources in the new storage allocation.

In various examples, the growth data from the analysis system 520 can also be provided to the tenants and/or to the data center operator. For example, the growth data for the storage allocation 510 can be provided to user interface 506, through which Tenant-0 502 can view the growth data. In this case, the growth data provided to the user interface includes only the growth data for the storage allocation 510, and possibly also other storage allocations assigned to Tenant-0 502.

Figure 6:
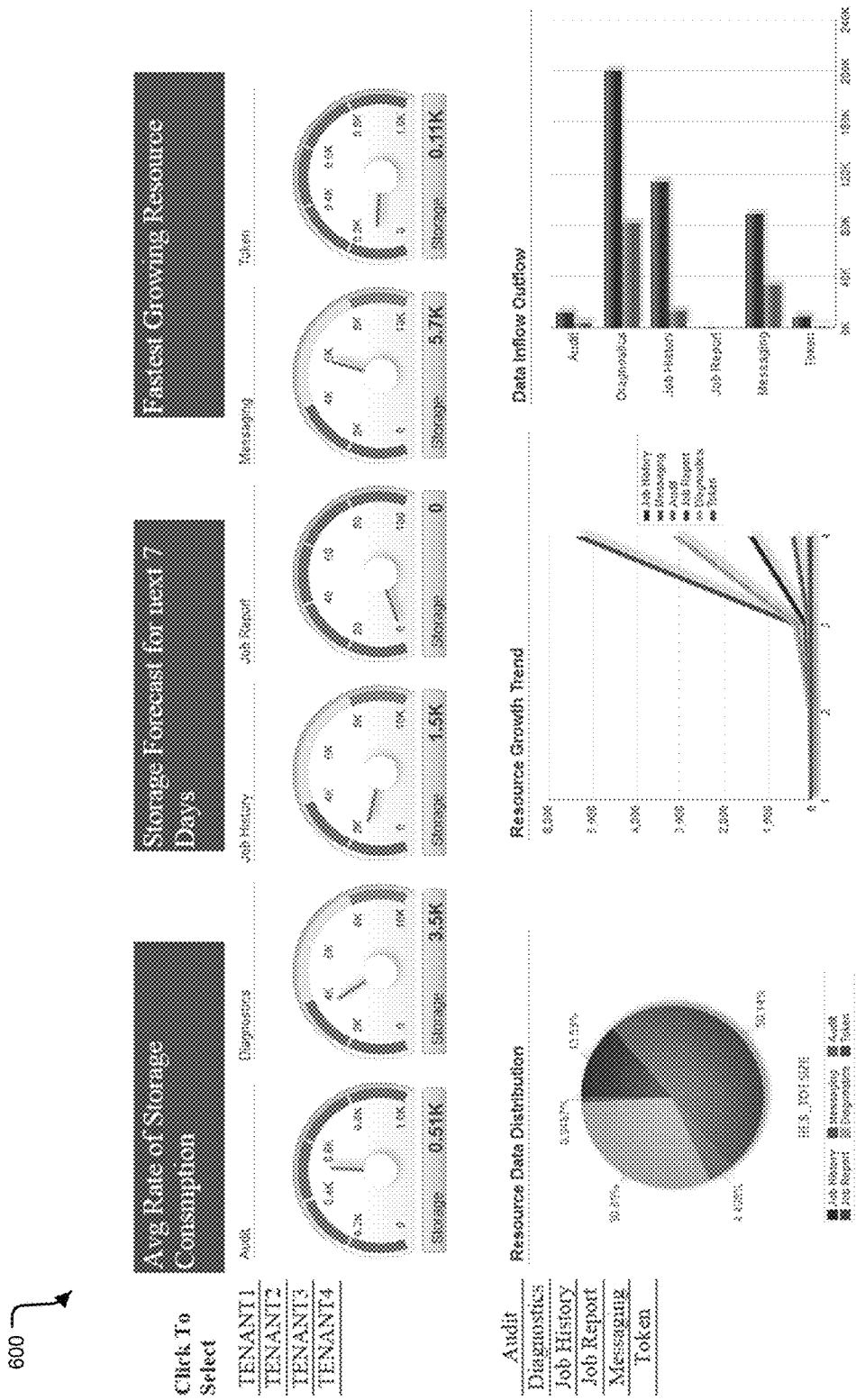
FIG. 6 illustrates an example of an interface that displays growth data.

As a further example, the growth data can be provided to a developer user interface 508, through which the data center operator can view the growth data. FIG. 6 illustrates an example of an interface 600 that displays growth data. In various examples, the interface 600 can display the growth data for individual storage allocations, for individual tenants (who may have more than one storage allocation), and/or for the data center as a whole. For example, the interface 600 can display the average rate of consumption of storage resources in the data center, and a forecast or prediction of storage that will be consumed in the next seven days (or another time period). As a further example, the interface 600 can display the fastest growing resource (e.g., the resource that is being consumed most quickly) in the data center. To assist the data center operator in determining future resource needs, the interface 600 can display a distribution of data that resources are being used for and growth trends for the different types of data. The interface 600 can also display data inflows and outflows; that is data being added or removed from storage allocations. Using this information, the data center operator can determine whether or when to add computing resources, storage resources, and/or networking resources to the data center.

Another system that can make use of the growth data from the analysis system is life cycle management. FIG. 7 illustrates an example of a data center 704 that includes life cycle management 750 for the storage allocations in the data center 704. In this example, a first tenant, Tenant-0 702*a*, is using the resources of a first storage allocation 710*a* for one or more services. For example, Tenant-0 702*a* can be using the first storage allocation 710*a* to run an online banking service. The first storage allocation 710*a* includes functional entities 712*a*, which can be defined by Tenant-0 702*a* and/or data center 704. The functional entities 712*a* map to various logical entities 714*a* in the first storage allocation 710*a*, which provide data structures for storing and organizing data associated with the functional entities 712*a*. The logical entities 714*a* map to physical storage 716*a* in the first storage allocation 710*a*, which can include data files on physical disks. In some examples, Tenant-0 702*a* may have more than one storage allocation in the data center 704, being used for the same services or different services. In various examples, Tenant-0 702*a* can view and manage the first storage allocation 710*a* (and possibly also any other storage allocation) through a user interface 706*a* provided by the data center 704.

In the example of FIG. 7, a second tenant, Tenant-1 702*b* is using the resources of a second storage allocation 710*b*. The second storage allocation 710*b* includes functional entities 712*b*, which can be similar to the functional entities 712*a* of the first storage allocation 710*a*, or can be entirely different. For example, while Tenant-0 702*a* can be using the first storage allocation 710*a* to run an online banking service, Tenant-1 702*b* can be using the second first storage allocation 710*b* to run a website that advertises the goods and services sold by the organization with which Tenant-1 702*b* is associated. The functional entities 712*b* of the second storage allocation 710*b* also map to logical entities 714*b*, which further map to physical storage 716*b*. Tenant-1 702*b* can be provided with a different instance of a user interface 706*b* to view and manage the second storage allocation 710*b*. The instance of the user interface 706*b* provided to Tenant-1 702*b* can be similar to the user interface 706*a* provided to Tenant-0 702*a*, may include features or functionality not available to Tenant-0 702*a*, and/or may not have all of the features or functionality available to Tenant-0 702*a*.

In various examples, the life cycle management 750 is an automated system that can periodically clean up data in the storage allocations. Data clean-up may otherwise need to be conducted manually by the tenant. Cleaning up data can include deleting certain data, which frees up the space occupied by the data and makes the space available for new data. Periodic clean-up of data can also be referred to as purging. Data can be deleted, for example, by deleting a functional entity, which can delete database entries and data in physical storage that is associated with the functional entity. As another example, deleting data can include removing data from table entries (e.g., among logical entities), which can result in data in the physical storage being deleted. In this example, one or more functional entities associated with the table entries is not removed, but may occupy less overall storage space. As another example, data files in the physical storage can be deleted. In this example, corresponding logical entities may change (e.g., a database may be able to remove an extent due to the data blocks for the extent having been deleted), though this need not be the case. Additionally, a functional entity that corresponds to the data files may be, but need not be deleted.

In various examples, life cycle management occurs on a periodic basis. The period and/or the data that are cleaned out can be specified, for example, in the service contract between the data center 704 and a tenant. For example, the service contract can specify that data that is older than 90 days (which can be referred to as the retention period) will be deleted. As a further example, the service contract may also specify that the data not have been modified in the last 90 days, or else the data is considered still in use. In various examples, the service contract and/or the tenant can specify the data retention time period. In various examples, the service contract and/or the tenant can specify the types of data that can be deleted once the retention period expires, and/or can specify types of data that will never be deleted. For example, the tenant may want to retain audit data for six months, but may only want to retain history data for 30 days.

In some examples, life cycle management can be implemented using a resource purge module. In these examples, the data center 704 can include a resource purge module for each tenant and/or for each storage allocation 710*a*-710*b*.

In various examples, the life cycle management 750 can use growth data output by an analysis system 720 to more efficiently clean up data in the storage allocations. The analysis system 720 can monitor the storage allocations, and predict the future growth of the functional entities, logical entities, and physical storage in the storage allocations. In various examples, the analysis system 720 can output the prediction as growth data, which can be input into the life cycle management 750 system.

The growth data can enable the life cycle management 750 to free up space in the storage allocations outside of the data retention policy specified by the service contract, so that tenants can make more efficient use of the space available to each tenant. For example, using the growth data from the analysis system 720, the life cycle management 750 can determine that the physical storage 716*a* in the first storage allocation 710*a* will be used up in the next week, while the end of the current retention period is still 60 days away. In this example, the life cycle management 750 can take several actions to prevent Tenant-0 702*a* from running out of space in the physical storage 716*a*. For example, the life cycle management 750 can determine to delete data early; that is, the life cycle management 750 can delete data that would otherwise be deleted when the retention period ends. In this example, the data that is deleted can be the oldest data.

As another example, the life cycle management 750 can inform Tenant-0 702a that the tenant will run out of space in the next week, and can ask Tenant-0 702a whether the tenant wants to delete some data. In some examples, the life cycle management 750 can use the growth data to suggest to Tenant-0 702a data to delete. For example, the life cycle management 750 can indicate, in the user interface 706a, the oldest data. Alternatively or additionally, the life cycle management 750 can indicate to Tenant-0 702a the functional entities 712a, logical entities 714a, and/or physical storage 716a that is growing the fastest, and thus may need maintenance. As another example, the life cycle management 750 can indicate to Tenant-0 702a the data that is growing the slowest, which may be the oldest and thus least needed data. In these and other examples, the life cycle management 750 can display prompts in the user interface 706a, which Tenant-0 702a can use to select data to delete or retain.

In various examples, other systems in a data center can make use of the growth data than can be output by an analysis system. For example, fault checkers and security systems can make use of the growth data. The growth data can indicate that some data has increased in size in unexpected and/or sudden ways. For example, certain types of data may be expected to grow at a steady pace, but the growth data instead shows that the data will increase exponentially in size. As another example, the growth data may show that data of a certain type may have suddenly spiked in size, when it was expected that the data should only grow at a certain rate.

In these and other examples, unexpected changes in the rate at which data is increasing can indicate several different problems in a storage allocation. For example, software being run in the storage allocation may be defective or malicious, and may be generating data in an uncontrolled or undesirable manner. For example, the software may be perpetrating a denial of service attack by occupying resources in the storage allocation to the point where the tenant is unable to use the resources. As another example, users associated with a tenant may be using the resources of the storage allocation in an undesirable or unauthorized manner. For example, users may be uploading movies into user accounts in the storage allocation. In these and other examples, a fault checking system and/or a security system may detect unwanted data growth by examining the growth data.

FIG. 8 illustrates an example of a process 800 for using growth data to adjust bundles of resources in a resource pool, so that the bundles of resources better reflect expected resource usage when the bundles of resources are used as a storage allocation. In various implementations, the process 800 can be executed by a computing system executing in a data center.

At step 802, the process 800 includes monitoring changes to data in a storage allocation, wherein the storage allocation includes a set of computing resources from computing resources of the data center, wherein the storage allocation is associated with a tenant of the data center, wherein the data center enables users associated with the tenant to use the set of computing resources during a subscription period, and wherein the storage allocation is associated with a category from a plurality of categories for storage allocations. In various examples, computing resources can include processing resources, storage resources, and/or networking resources. In some examples, changes to the data in the storage allocation can include increases and decreases in the size of the data. In some examples, changes to the data can include increases and decreases in the number of functional entities, the number of logical entities, and/or the amount of physical storage being used at a moment in time. In some examples, the changes are monitored over a period of time, such as a number of hours, a number of days, a number of weeks, a number of months, or a different period of time.

At step 804, the process 800 includes determining an expected resource usage for the storage allocation, wherein the expected resource usage projects an amount of computing resources the storage allocation will use after a period of time following a current time, and wherein the expected resource usage is determined from the changes to the data. In some examples, determining the expected resource usage can include conducting a statistical analysis, such as a linear regression, using information determined from the changes to the data. In some examples, the expected usage is projected for a period of time, such as a day, seven days, 30 days, or another time period, where the time period is after a current time. At the current time, the expected usage can be determined and reported, for example to the tenant and/or to the data center operator. Alternatively or additionally, the expected usage can be recorded for record keeping purposes and/or for later use.

At step 806, the process 800 includes determining that the expected resource usage is greater than a size of a bundle of resources from a resource pool, wherein the bundle of resources includes a set of unused computing resources that has been pre-allocated for use as a new storage allocation of a same category as the category for the storage allocation, wherein the size of the bundle of resources corresponds to an amount of the set of unused computing resources. Unused computing resources are computing resources that are not allocated to storage allocations. Being unused means that the computing resources are not being used by any tenant. The unused computing resources may be idle. In various examples, the bundle of resources in which the unused computing resources are included has been pre-allocated for future use as a storage allocation. Pre-allocating the bundle of resources enables a new storage allocation to be configured quickly. For example, the bundle of resources may only need to be configured for the particular service or services for which the tenant intends to use the new storage allocation.

The bundle of resources includes a size, in terms of the amount of computing resources included in the bundles of resources. For example, the bundle of resources can include a certain amount of physical storage. The size of the bundle of resources may have been estimated by the data center operator. When the expected resource usage, determined at step 804, is greater than the size of the bundle of resources, the size of the bundle of resources may not accurately reflect the actual usage of the resources, once the resources are made available to a tenant as a storage allocation.

At step 808, the process 800 includes instructing a provisioning system of the data center to increase the size of the bundle of resources to correspond to the expected resource usage for the storage allocation, wherein increasing the size of the bundle of resources includes allocating additional unused computing resources to the bundle of resources. In some examples, increasing the size of the bundle of resources can include allocating additional computing resources to the bundle of resources. For example, increasing the size of the bundle of resources can include allocating unused physical storage to the bundle of resources.

In some examples, before the provisioning system is configured to increase the size of the bundle of resources, the bundle of resources has a first size. In these examples, the storage allocation could have been configured from a second bundle of resources from the resource pool, the second bundle of resources being the first size. In some examples, the resource pool can include bundles of resources of different categories. For example, the resource pool can include a "small" category, including bundles of resources having a certain size; a "medium" category that has bundles of resources that are somewhat larger; and a "large" category that has bundles of resources that are even larger. Size, in this context, refers to the amount of computing resources allocated to each bundle of resources. In these and other examples, the storage allocation could have been configured from a bundle of resources from a certain category (e.g., the "medium" category). Additionally, at step 808, the provisioning system can be instructed to increase the size of each of the bundles of resources in this category (e.g., the "medium" category).

In some examples, the process 800 can further include receiving a request for a second storage allocation. In these examples, the process 800 can further include determining that the request is associated with a subscription of the same category as the category for the storage allocation. The process 800 can further include instructing the provisioning system to configure the bundle of resources according to the request, wherein, when configured, the set of unused computing resources and the additional unused computing resources included in the bundle of resources are assigned to the second storage allocation.

In some examples, the process 800 can further include determining an expected number of storage allocations for the category, wherein the expected number of storage allocations project storage allocations for subscriptions expected to be received after the current time. In these examples, the process 800 can further include determining that the expected number of storage allocations is greater than a number of bundles of resources associated with the category. The process 800 can further include allocating additional bundles of resources, wherein allocating the additional bundles of resources includes allocating additional unused computing resources to each of the additional bundles of resources.

In some examples, the data center includes a pool of physical resources. A first portion of the pool of physical resources can be included in the storage allocation. A different, second portion of the pool of physical resources can be included in the bundle of resources. Yet another, third portion of the pool of physical resources can be not allocated before the provisioning system is instructed to increase the size of the bundle of resources. In this example, when the size of the bundle of resources is increased, physical resources can be taken from the third portion, and allocated to the bundle of resources.

Figure 9:
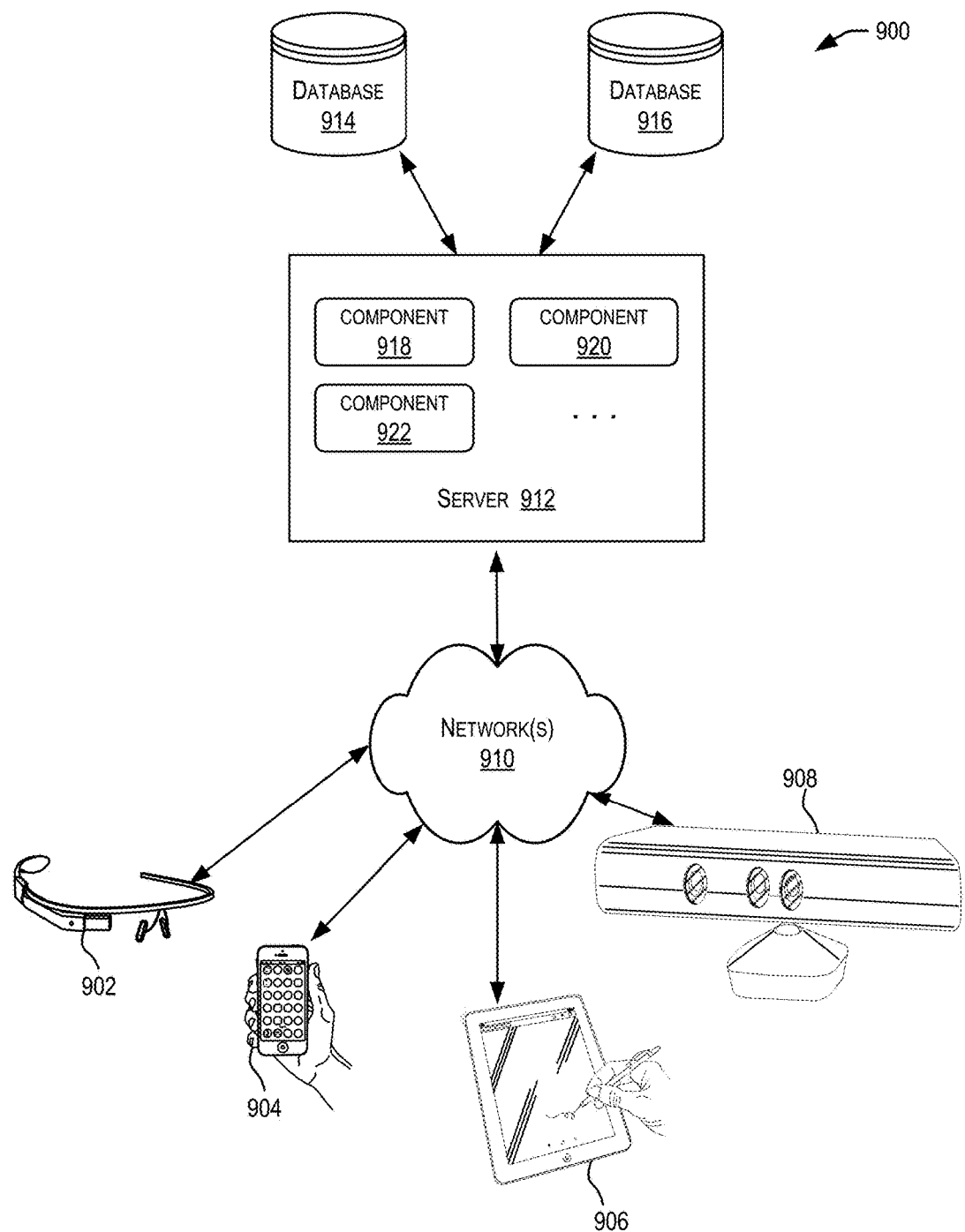
FIG. 9 depicts a simplified diagram of a distributed system for implementing examples discussed herein.

FIG. 9 depicts a simplified diagram of a distributed system 900 for implementing examples discussed herein. In the illustrated embodiment, distributed system 900 includes one or more client computing devices 902, 904, 906, and 908, coupled to a server 912 via one or more communication networks 910. Clients computing devices 902, 904, 906, and 908 may be configured to execute one or more applications.

In various embodiments, server 912 may be adapted to run one or more services or software applications that enable an application executed by a client computing device to specify the application's storage-related requirements and server 912 enables the selection of a storage virtual machine for servicing the application's storage-related services based upon the application's specified storage-related requirements, as described in this disclosure. For example, in certain embodiments, server 912 may receive application storage profile information for an application, where the application storage profile information includes information about the application and also identifies that application's storage-related requirements. Server 912 may then generate a unique application identifier (application ID) for the application and select, based upon the application storage profile information, one or more storage virtual machines for servicing that application's storage needs. The selected one or more storage virtual machines are ones that can support, i.e., can provide or satisfy, the application's storage requirements specified in the application storage profile information for the application. Information identifying the application ID and the selected one or more storage virtual machines is communicated from server 912 to a system (application system) that will execute the application. For example, if a client computing device is configured to execute the application, the application ID and selected storage virtual machine information may be sent by server 912 to that client computing device. Information identifying the application ID and the application storage profile information is communicated from server 912 to the selected storage virtual machines. During runtime processing, a storage request generated by the application and associated with the application ID is routed from the device executing the application to a storage virtual machine that is configured to service that application's storage requests. The storage virtual machine receiving the storage request is able to determine the corresponding storage-related requirements associated with the application ID and service the storage request in accordance with those storage-related requirements. In this manner, storage services are provided to that application in accordance with that application's specified storage requirements.

In certain embodiments, server 912 may also provide other services or software applications that can include non-virtual and virtual environments. In some embodiments, these services may be offered as web-based or cloud services, such as under a Software as a Service (SaaS) model to the users of client computing devices 902, 904, 906, and/or 908. Users operating client computing devices 902, 904, 906, and/or 908 may in turn utilize one or more client applications to interact with server 912 to utilize the services provided by these components.

In the configuration depicted in FIG. 9, server 912 may include one or more components 918, 920 and 922 that implement the functions performed by server 912. These components may include software components that may be executed by one or more processors, hardware components, or combinations thereof. It should be appreciated that various different system configurations are possible, which may be different from distributed system 900. The embodiment shown in FIG. 9 is thus one example of a distributed system for implementing an embodiment system and is not intended to be limiting.

Users may use client computing devices 902, 904, 906, and/or 908 to execute one or more applications, which may generate one or more storage requests that may then be serviced in accordance with the teachings of this disclosure. A client device may provide an interface that enables a user of the client device to interact with the client device. The client device may also output information to the user via this interface. Although FIG. 9 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 910 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 910 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics Engineers (IEEE) 1002.11 suite of protocols, Bluetooth®, and/or any other wireless protocol), and/or any combination of these and/or other networks.

Server 912 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 912 can include one or more virtual machines running virtual operating systems, or other computing architectures involving virtualization such as one or more flexible pools of logical storage devices that can be virtualized to maintain virtual storage devices for the server. In various embodiments, server 912 may be adapted to run one or more services or software applications that provide the functionality described in the foregoing disclosure.

The computing systems in server 912 may run one or more operating systems including any of those discussed above, as well as any commercially available server operating system. Server 912 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 912 may include one or more applications to analyze and consolidate data feeds and/or event updates received from users of client computing devices 902, 904, 906, and 908. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 912 may also include one or more applications to display the data feeds and/or real-time events via one or more display devices of client computing devices 902, 904, 906, and 908.

Distributed system 900 may also include one or more data repositories 914, 916. These data repositories may be used to store data and other information in certain embodiments. For example, one or more of the data repositories 914, 916 may be used to store information such as information related to storage virtual machines, information mapping application IDs to application to selected storage virtual machines, and other information used by server 912 when performing storage controller system functions. Data repositories 914, 916 may reside in a variety of locations. For example, a data repository used by server 912 may be local to server 912 or may be remote from server 912 and in communication with server 912 via a network-based or dedicated connection. Data repositories 914, 916 may be of different types. In certain embodiments, a data repository used by server 912 may be a database, for example, a relational database, such as databases provided by Oracle Corporation® and other vendors. One or more of these databases may be adapted to enable storage, update, and retrieval of data to and from the database in response to SQL-formatted commands.

In certain embodiments, one or more of data repositories 914, 916 may also be used by applications to store application data. The data repositories used by applications may be of different types such as, for example, a key-value store repository, an object store repository, or a general storage repository supported by a file system.

Figure 10:
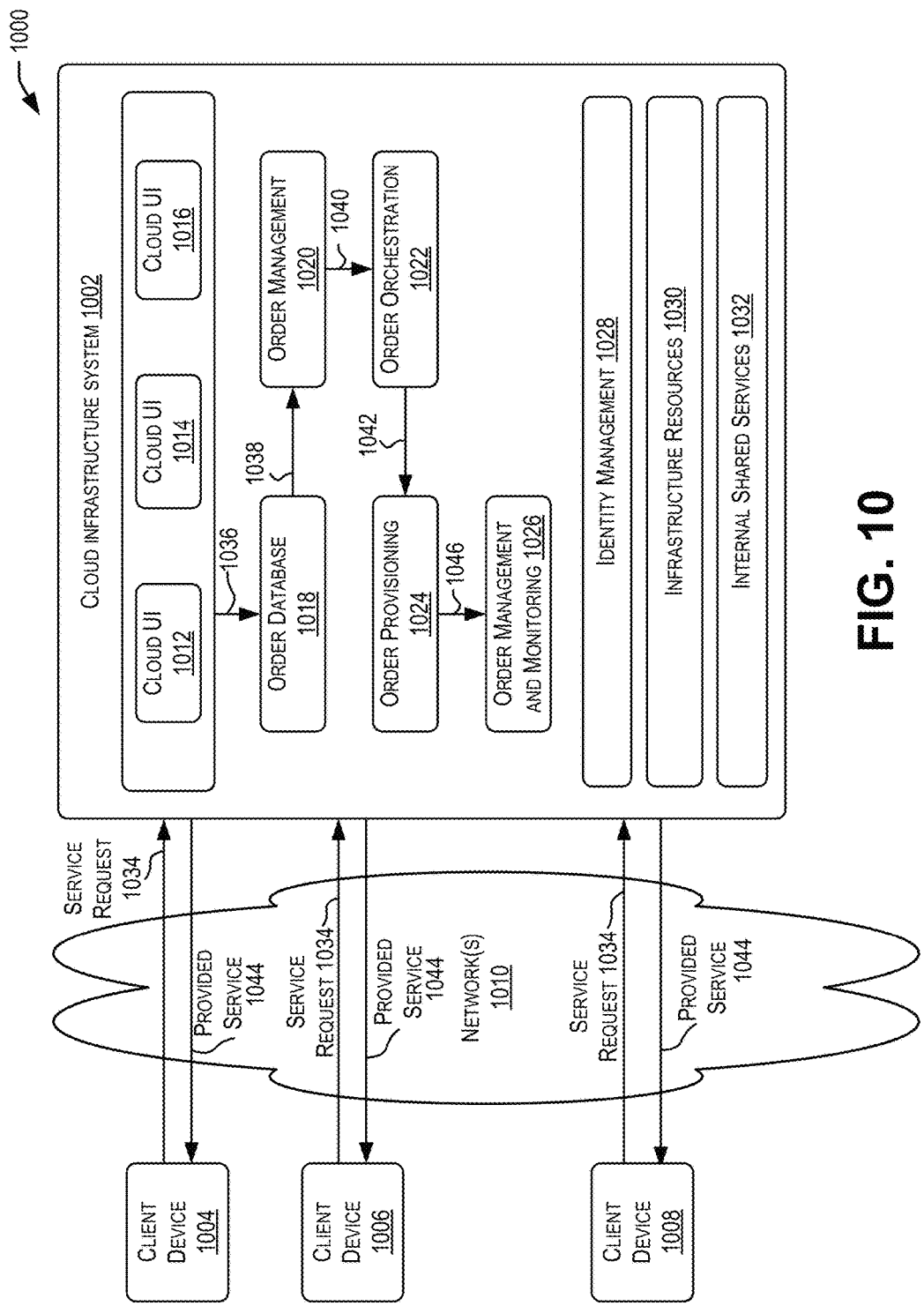
FIG. 10 is a simplified block diagram of a cloud-based system environment.

In certain embodiments, the storage-related functionalities described in this disclosure may be offered as services via a cloud environment. FIG. 10 is a simplified block diagram of a cloud-based system environment 1000 in which various storage-related services may be offered as cloud services, in accordance with certain embodiments. In the embodiment depicted in FIG. 10, cloud infrastructure system 1002 may provide one or more cloud services that may be requested by users using one or more client computing devices 1004, 1006, and 1008. Cloud infrastructure system 1002 may comprise one or more computers and/or servers that may include those described above for server 912. The computers in cloud infrastructure system 1002 may be organized as general purpose computers, specialized server computers, server farms, server clusters, or any other appropriate arrangement and/or combination.

Network(s) 1010 may facilitate communication and exchange of data between clients 1004, 1006, and 1008 and cloud infrastructure system 1002. Network(s) 1010 may include one or more networks. The networks may be of the same or different types. Network(s) 1010 may support one or more communication protocols, including wired and/or wireless protocols, for facilitating the communications.

The embodiment depicted in FIG. 10 is only one example of a cloud infrastructure system and is not intended to be limiting. It should be appreciated that, in some other embodiments, cloud infrastructure system 1002 may have more or fewer components than those depicted in FIG. 10, may combine two or more components, or may have a different configuration or arrangement of components. For example, although FIG. 10 depicts three client computing devices, any number of client computing devices may be supported in alternative embodiments.

The term cloud service is generally used to refer to a service that is made available to users on demand and via a communication network such as the Internet by systems (e.g., cloud infrastructure system 1002) of a service provider. Typically, in a public cloud environment, servers and systems that make up the cloud service provider's system are different from the customer's own on-premise servers and systems. The cloud service provider's systems are managed by the cloud service provider. Customers can thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, Calif., such as middleware services, database services, Java cloud services, and others.

In certain embodiments, cloud infrastructure system 1002 may provide one or more cloud services using different models such as under a Software as a Service (SaaS) model, a Platform as a Service (PaaS) model, an Infrastructure as a Service (IaaS) model, and others, including hybrid service models. Cloud infrastructure system 1002 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 1002. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 1002. Cloud infrastructure system 1002 then performs processing to provide the services requested in the customer's subscription order. For example, a user may request the cloud infrastructure system to register an application, as described above, and provide storage-related services to the application per the application's specified storage-related requirements. Cloud infrastructure system 1002 may be configured to provide one or even multiple cloud services.

Cloud infrastructure system 1002 may provide the cloud services via different deployment models. In a public cloud model, cloud infrastructure system 1002 may be owned by a third party cloud services provider and the cloud services are offered to any general public customer, where the customer can be an individual or an enterprise. In certain other embodiments, under a private cloud model, cloud infrastructure system 1002 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other embodiments, under a community cloud model, the cloud infrastructure system 1002 and the services provided may be shared by several organizations in a related community. Various other models such as hybrids of the above mentioned models may also be used.

Client computing devices 1004, 1006, and 1008 may be of different types (such as devices 902, 904, 906, and 908 depicted in FIG. 9) and may be capable of operating one or more client applications. A user may use a client device to interact with cloud infrastructure system 1002, such as to request a service provided by cloud infrastructure system 1002. For example, a user may use a client device to request a storage-related service described in this disclosure.

In some embodiments, the processing performed by cloud infrastructure system 1002 for providing storage-related services may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. For example, big data analysis may be performed by cloud infrastructure system 1002 for determining which storage virtual machine is to be selected for a particular application based upon the application's stated storage-related requirements. The data used for this analysis may include structured data (e.g., data stored in a database or structured according to a structured model) and/or unstructured data (e.g., data blobs (binary large objects)).

As depicted in the embodiment in FIG. 10, cloud infrastructure system 1002 may include infrastructure resources 1030 that are utilized for facilitating the provision of various cloud services offered by cloud infrastructure system 1002. Infrastructure resources 1030 may include, for example, processing resources, storage or memory resources, networking resources, and the like. In certain embodiments, the storage virtual machines that are available for servicing storage requested from applications may be part of cloud infrastructure system 1002. In other embodiments, the storage virtual machines may be part of different systems.

In certain embodiments, to facilitate efficient provisioning of these resources for supporting the various cloud services provided by cloud infrastructure system 1002 for different customers, the resources may be bundled into sets of resources or resource modules (also referred to as "pods"). Each resource module or pod may comprise a pre-integrated and optimized combination of resources of one or more types. In certain embodiments, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 1002 may itself internally use services 1032 that are shared by different components of cloud infrastructure system 1002 and which facilitate the provisioning of services by cloud infrastructure system 1002. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 1002 may comprise multiple subsystems. These subsystems may be implemented in software, or hardware, or combinations thereof. As depicted in FIG. 10, the subsystems may include a user interface subsystem 1012 that enables users or customers of cloud infrastructure system 1002 to interact with cloud infrastructure system 1002. User interface subsystem 1012 may include various different interfaces such as a web interface 1014, an online store interface 1016 where cloud services provided by cloud infrastructure system 1002 are advertised and are purchasable by a consumer, and other interfaces 1018. For example, a customer may, using a client device, request (service request 1034) one or more services provided by cloud infrastructure system 1002 using one or more of interfaces 1014, 1016, and 1018. For example, a customer may access the online store, browse cloud services offered by cloud infrastructure system 1002, and place a subscription order for one or more services offered by cloud infrastructure system 1002 that the customer wishes to subscribe to. The service request may include information identifying the customer and one or more services that the customer desires to subscribe to. For example, a customer may place a subscription order for a storage-related service offered by cloud infrastructure system 1002. As part of the order, the customer may provide information identifying an application for which the service is to be provided and the application storage profile information for the application.

In certain embodiments, such as the embodiment depicted in FIG. 10, cloud infrastructure system 1002 may comprise an order management subsystem (OMS) 1020 that is configured to process the new order. As part of this processing, OMS 1020 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 1020 may then invoke the order provisioning subsystem (OPS) 1024 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 1024 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

In certain embodiments, setup phase processing, as described above, may be performed by cloud infrastructure system 1002 as part of the provisioning process. Cloud infrastructure system 1002 may generate an application ID and select a storage virtual machine for an application from among storage virtual machines provided by cloud infrastructure system 1002 itself or from storage virtual machines provided by other systems other than cloud infrastructure system 1002.

Cloud infrastructure system 1002 may send a response or notification 1044 to the requesting customer to indicate when the requested service is now ready for use. In some instances, information (e.g., a link) may be sent to the customer that enables the customer to start using and availing the benefits of the requested services. In certain embodiments, for a customer requesting the storage-related service, the response may include an application ID generated by cloud infrastructure system 1002 and information identifying a storage virtual machine selected by cloud infrastructure system 1002 for an application corresponding to the application ID.

Cloud infrastructure system 1002 may provide services to multiple customers. For each customer, cloud infrastructure system 1002 is responsible for managing information related to one or more subscription orders received from the customer, maintaining customer data related to the orders, and providing the requested services to the customer. Cloud infrastructure system 1002 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 1002 may provide services to multiple customers in parallel. Cloud infrastructure system 1002 may store information for these customers, including possibly proprietary information. In certain embodiments, cloud infrastructure system 1002 comprises an identity management subsystem (IMS) 1028 that is configured to manage customers information and provide the separation of the managed information such that information related to one customer is not accessible by another customer. IMS 1028 may be configured to provide various security-related services such as identity services, such as information access management, authentication and authorization services, services for managing customer identities and roles and related capabilities, and the like.

Figure 11:
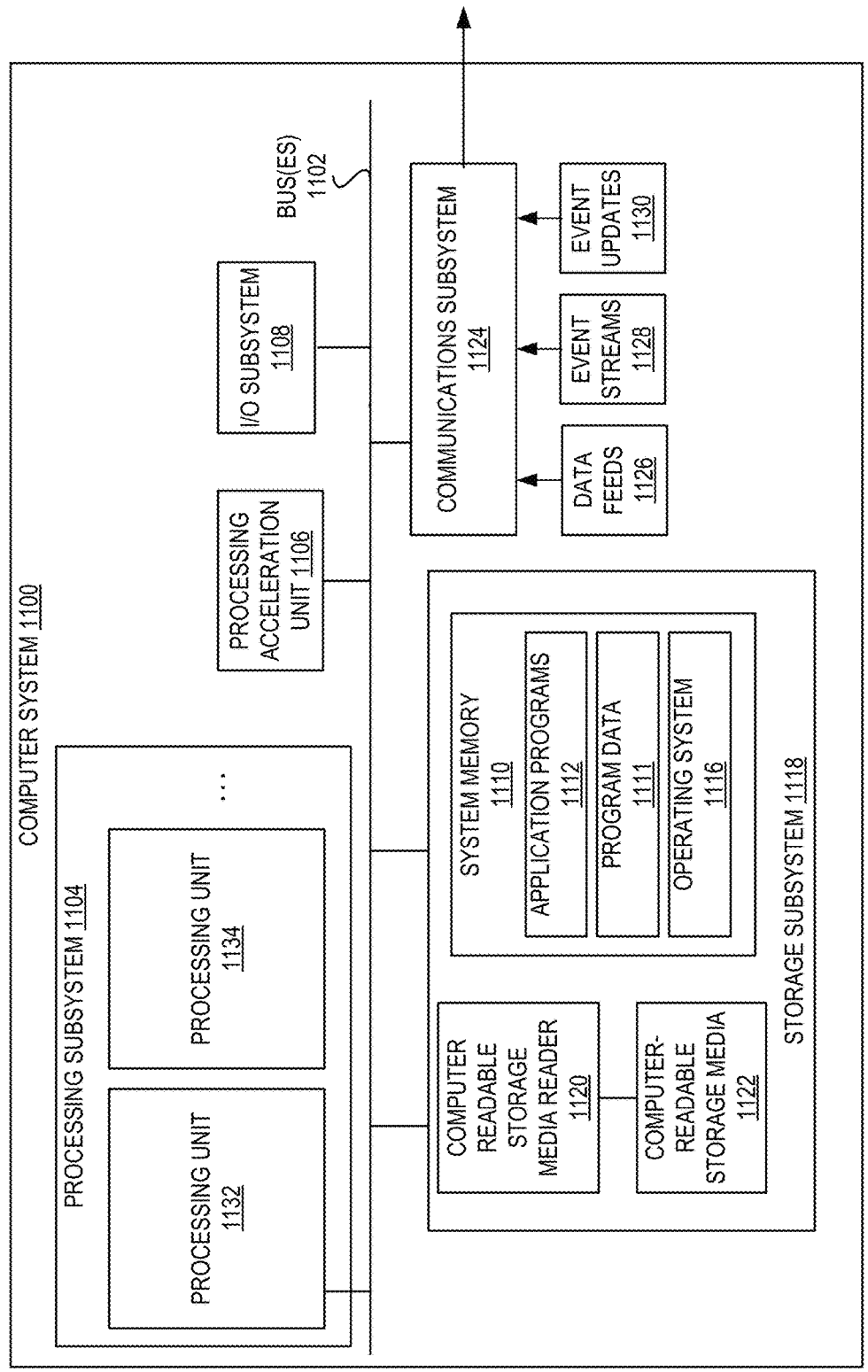
FIG. 11 illustrates a computer system.

FIG. 11 illustrates a computer system 1100 that may be used to implement certain embodiments. For example, in some embodiments, computer system 1100 may be used to implement any of the application system, storage controller system, systems within a data center, and various servers and computer systems described above. As shown in FIG. 11, computer system 1100 includes various subsystems including a processing subsystem 1104 that communicates with a number of other subsystems via a bus subsystem 1102. These other subsystems may include a processing acceleration unit 1106, an I/O subsystem 1108, a storage subsystem 1118, and a communications subsystem 1124. Storage subsystem 1118 may include non-transitory computer-readable storage media including storage media 1122 and a system memory 1110.

Bus subsystem 1102 provides a mechanism for letting the various components and subsystems of computer system 1100 communicate with each other as intended. Although bus subsystem 1102 is shown schematically as a single bus, alternative embodiments of the bus subsystem may utilize multiple buses. Bus subsystem 1102 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 1104 controls the operation of computer system 1100 and may comprise one or more processors, application specific integrated circuits (ASICs), or field programmable gate arrays (FPGAs). The processors may include be single core or multicore processors. The processing resources of computer system 1100 can be organized into one or more processing units 1132, 1134, etc. A processing unit may include one or more processors, one or more cores from the same or different processors, a combination of cores and processors, or other combinations of cores and processors. In some embodiments, processing subsystem 1104 can include one or more special purpose co-processors such as graphics processors, digital signal processors (DSPs), or the like. In some embodiments, some or all of the processing units of processing subsystem 1104 can be implemented using customized circuits, such as application specific integrated circuits (ASICs), or field programmable gate arrays (FPGAs).

In some embodiments, the processing units in processing subsystem 1104 can execute instructions stored in system memory 1110 or on computer readable storage media 1122. In various embodiments, the processing units can execute a variety of programs or code instructions and can maintain multiple concurrently executing programs or processes. At any given time, some or all of the program code to be executed can be resident in system memory 1110 and/or on computer-readable storage media 1122 including potentially on one or more storage devices. Through suitable programming, processing subsystem 1104 can provide various functionalities described above. In instances where computer system 1100 is executing one or more virtual machines, one or more processing units may be allocated to each virtual machine.

In certain embodiments, a processing acceleration unit 1106 may optionally be provided for performing customized processing or for off-loading some of the processing performed by processing subsystem 1104 so as to accelerate the overall processing performed by computer system 1100.

I/O subsystem 1108 may include devices and mechanisms for inputting information to computer system 1100 and/or for outputting information from or via computer system 1100. In general, use of the term input device is intended to include all possible types of devices and mechanisms for inputting information to computer system 1100. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3-D) mice, joysticks or pointing sticks, gamepads and graphic tablets, and audio/visual devices such as speakers, digital cameras, digital camcorders, portable media players, webcams, image scanners, fingerprint scanners, barcode reader, 3-D scanners, 3-D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 1100 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1118 provides a repository or data store for storing information and data that is used by computer system 1100. Storage subsystem 1118 provides a tangible non-transitory computer-readable storage medium for storing the basic programming and data constructs that provide the functionality of some embodiments. Storage subsystem 1118 may store software (e.g., programs, code modules, instructions) that when executed by processing subsystem 1104 provides the functionality described above. The software may be executed by one or more processing units of processing subsystem 1104. Storage subsystem 1118 may also provide a repository for storing data used in accordance with the teachings of this disclosure.

Storage subsystem 1118 may include one or more non-transitory memory devices, including volatile and non-volatile memory devices. As shown in FIG. 11, storage subsystem 1118 includes a system memory 1110 and a computer-readable storage media 1122. System memory 1110 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1100, such as during start-up, may typically be stored in the ROM. The RAM typically contains data and/or program modules that are presently being operated and executed by processing subsystem 1104. In some implementations, system memory 1110 may include multiple different types of memory, such as static random access memory (SRAM), dynamic random access memory (DRAM), and the like.

By way of example, and not limitation, as depicted in FIG. 11, system memory 1110 may load application programs 1112 that are being executed, which may include various applications such as Web browsers, mid-tier applications, relational database management systems (RDBMS), etc., program data 1111, and an operating system 1116. By way of example, operating system 1116 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 1122 may store programming and data constructs that provide the functionality of some embodiments. Computer-readable storage media 1122 may provide storage of computer-readable instructions, data structures, program modules, and other data for computer system 1100. Software (programs, code modules, instructions) that, when executed by processing subsystem 1104 provides the functionality described above, may be stored in storage subsystem 1118. By way of example, computer-readable storage media 1122 may include non-volatile memory such as a hard disk drive, a magnetic disk drive, an optical disk drive such as a CD ROM, DVD, a Blu-Ray® disk, or other optical media. Computer-readable storage media 1122 may include, but is not limited to, Zip® drives, flash memory cards, universal serial bus (USB) flash drives, secure digital (SD) cards, DVD disks, digital video tape, and the like. Computer-readable storage media 1122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain embodiments, storage subsystem 1118 may also include a computer-readable storage media reader 1120 that can further be connected to computer-readable storage media 1122. Reader 1120 may receive and be configured to read data from a memory device such as a disk, a flash drive, etc.

In certain embodiments, computer system 1100 may support virtualization technologies, including but not limited to virtualization of processing and memory resources. For example, computer system 1100 may provide support for executing one or more virtual machines. In certain embodiments, computer system 1100 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 1100. Accordingly, multiple operating systems may potentially be run concurrently by computer system 1100.

Communications subsystem 1124 provides an interface to other computer systems and networks. Communications subsystem 1124 serves as an interface for receiving data from and transmitting data to other systems from computer system 1100. For example, communications subsystem 1124 may enable computer system 1100 to establish a communication channel to one or more client devices via the Internet for receiving and sending information from and to the client devices.

Communication subsystem 1124 may support both wired and/or wireless communication protocols. For example, in certain embodiments, communications subsystem 1124 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some embodiments communications subsystem 1124 can provide wired network connectivity (e.g., Ethernet) in addition to or instead of a wireless interface.

Communication subsystem 1124 can receive and transmit data in various forms. For example, in some embodiments, in addition to other forms, communications subsystem 1124 may receive input communications in the form of structured and/or unstructured data feeds 1126, event streams 1128, event updates 1130, and the like. For example, communications subsystem 1124 may be configured to receive (or send) data feeds 1126 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 1124 may be configured to receive data in the form of continuous data streams, which may include event streams 1128 of real-time events and/or event updates 1130, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1124 may also be configured to communicate data from computer system 1100 to other computer systems or networks. The data may be communicated in various different forms such as structured and/or unstructured data feeds 1126, event streams 1128, event updates 1130, and the like to one or more databases that may be in communication with one or more streaming data source computers coupled to computer system 1100.

Computer system 1100 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 1100 depicted in FIG. 11 is intended only as a specific example. Many other configurations having more or fewer components than the system depicted in FIG. 11 are possible. Based on the disclosure and teachings provided herein, a person of ordinary skill in the art will appreciate other ways and/or methods to implement the various embodiments.

Although specific embodiments have been described, various modifications, alterations, alternative constructions, and equivalents are possible. Embodiments are not restricted to operation within certain specific data processing environments, but are free to operate within a plurality of data processing environments. Additionally, although certain embodiments have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described embodiments may be used individually or jointly.

Further, while certain embodiments have been described using a particular combination of hardware and software, it should be recognized that other combinations of hardware and software are also possible. Certain embodiments may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A computer-implemented method, comprising:
   monitoring, by a computing system operating in a data center, changes to data in a storage allocation, wherein the storage allocation includes a set of computing resources from computing resources of the data center, wherein the storage allocation is associated with a tenant of the data center, wherein the data center enables users associated with the tenant to use the set of computing resources during a subscription period, and wherein the storage allocation is associated with a category from a plurality of categories for storage allocations;
   determining an expected resource usage for the storage allocation, wherein the expected resource usage projects an amount of computing resources the storage allocation will use after a period of time following a current time, and wherein the expected resource usage is determined using the changes to the data;
   determining that the expected resource usage is greater than a size of a bundle of resources from a resource pool, wherein the bundle of resources includes a set of unused computing resources that has been pre-allocated for use as a new storage allocation of a same category as the category for the storage allocation, wherein the size of the bundle of resources corresponds to an amount of the set of unused computing resources; and
   instructing a provisioning system of the data center to increase the size of the bundle of resources to correspond to the expected resource usage for the storage allocation, wherein increasing the size of the bundle of resources includes allocating additional unused computing resources to the bundle of resources.

2. The computer-implemented method of claim 1, wherein, before the provisioning system is configured to increase the size of the bundle of resources, the bundle of resources has a first size, wherein the storage allocation was configured from a second bundle of resources from the resource pool, the second bundle of resources being the first size.

3. The computer-implemented method of claim 1, further comprising:
   receiving a request for a second storage allocation;
   determining that the request is associated with a subscription of the same category as the category for the storage allocation; and instructing the provisioning system to configure the bundle of resources according to the request, wherein, when configured, the set of unused computing resources and the additional unused computing resources included in the bundle of resources are assigned to the second storage allocation.

4. The computer-implemented method of claim 1, further comprising:
  determining an expected number of storage allocations for the category, wherein the expected number of storage allocations project storage allocations for subscriptions expected to be received after the current time;
  determining that the expected number of storage allocations is greater than a number of bundles of resources associated with the category; and
  allocating additional bundles of resources, wherein allocating the additional bundles of resources includes allocating additional unused computing resources to each of the additional bundles of resources.

5. The computer-implemented method of claim 1, wherein unused computing resources are computing resources that are not allocated to storage allocations.

6. The computer-implemented method of claim 1, wherein increasing the size of the bundle of resources includes allocating unused physical storage to the bundle of resources.

7. The computer-implemented method of claim 1, wherein the data center includes a pool of physical resources, wherein a first portion of the pool of physical resources is included in the storage allocation, wherein a second portion of the pool of physical resources is included in the bundle of resources, wherein a third portion of the pool of physical resources is not allocated before the provisioning system is instructed to increase the size of the bundle of resources.

8. The computer-implemented method of claim 1, wherein computing resources include processing resources, storage resources, or networking resources.

9. The computer-implemented method of claim 1, further comprising:
  determining a mapping between a functional entity of the storage allocation and physical storage associated with the storage allocation, wherein a functional entity represents data in the storage allocation, and wherein the expected resource usage is determined using the mapping.

10. A computing system operating in a data center, comprising:
  one or more processors; and
  a non-transitory computer-readable medium communicatively coupled to the one or more processors, the non-transitory computer-readable medium including instructions that, when executed by the one or more processors, cause the one or more processors to perform operations including:
    monitoring changes to data in a storage allocation, wherein the storage allocation includes a set of computing resources from computing resources of the data center, wherein the storage allocation is associated with a tenant of the data center, wherein the data center enables users associated with the tenant to use the set of computing resources during a subscription period, and wherein the storage allocation is associated with a category from a plurality of categories for storage allocations;
    determining an expected resource usage for the storage allocation, wherein the expected resource usage projects an amount of computing resources the storage allocation will use after a period of time following a current time, and wherein the expected resource usage is determined using the changes to the data;
    determining that the expected resource usage is greater than a size of a bundle of resources from a resource pool, wherein the bundle of resources includes a set of unused computing resources that has been pre-allocated for use as a new storage allocation of a same category as the category for the storage allocation, wherein the size of the bundle of resources corresponds to an amount of the set of unused computing resources; and
    instructing a provisioning system of the data center to increase the size of the bundle of resources to correspond to the expected resource usage for the storage allocation, wherein increasing the size of the bundle of resources includes allocating additional unused computing resources to the bundle of resources.

11. The computing system of claim 10, wherein, before the provisioning system is configured to increase the size of the bundle of resources, the bundle of resources has a first size, wherein the storage allocation was configured from a second bundle of resources from the resource pool, the second bundle of resources being the first size.

12. The computing system of claim 10, wherein the non-transitory computer-readable medium further includes instructions that, when executed by the one or more processors, cause the one or more processors to perform operations including:
  receiving a request for a second storage allocation;
  determining that the request is associated with a subscription of the same category as the category for the storage allocation; and
  instructing the provisioning system to configure the bundle of resources according to the request, wherein, when configured, the set of unused computing resources and the additional unused computing resources included in the bundle of resources are assigned to the second storage allocation.

13. The computing system of claim 10, wherein the non-transitory computer-readable medium further includes instructions that, when executed by the one or more processors, cause the one or more processors to perform operations including:
  determining an expected number of storage allocations for the category, wherein the expected number of storage allocations project storage allocations for subscriptions expected to be received after the current time;
  determining that the expected number of storage allocations is greater than a number of bundles of resources associated with the category; and
  allocating additional bundles of resources, wherein allocating the additional bundles of resources includes allocating additional unused computing resources to each of the additional bundles of resources.

14. The computing system of claim 10, wherein unused computing resources are computing resources that are not allocated to storage allocations.

15. The computing system of claim 10, wherein increasing the size of the bundle of resources includes allocating unused physical storage to the bundle of resources.

16. A non-transitory computer-readable medium including instructions that, when executed by one or more processors, cause the one or more processors to perform operations including:

monitoring changes to data in a storage allocation in a data center, wherein the storage allocation includes a set of computing resources from computing resources of the data center, wherein the storage allocation is associated with a tenant of the data center, wherein the data center enables users associated with the tenant to use the set of computing resources during a subscription period, and wherein the storage allocation is associated with a category from a plurality of categories for storage allocations;

determining an expected resource usage for the storage allocation, wherein the expected resource usage projects an amount of computing resources the storage allocation will use after a period of time following a current time, and wherein the expected resource usage is determined using the changes to the data;

determining that the expected resource usage is greater than a size of a bundle of resources from a resource pool, wherein the bundle of resources includes a set of unused computing resources that has been pre-allocated for use as a new storage allocation of a same category as the category for the storage allocation, wherein the size of the bundle of resources corresponds to an amount of the set of unused computing resources; and instructing a provisioning system of the data center to increase the size of the bundle of resources to correspond to the expected resource usage for the storage allocation, wherein increasing the size of the bundle of resources includes allocating additional unused computing resources to the bundle of resources.

17. The non-transitory computer-readable medium of claim 16, wherein, before the provisioning system is configured to increase the size of the bundle of resources, the bundle of resources has a first size, wherein the storage allocation was configured from a second bundle of resources from the resource pool, the second bundle of resources being the first size.

18. The non-transitory computer-readable medium of claim 16, wherein the non-transitory computer-readable medium further includes instructions that, when executed by the one or more processors, cause the one or more processors to perform operations including:

receiving a request for a second storage allocation;

determining that the request is associated with a subscription of the same category as the category for the storage allocation; and instructing the provisioning system to configure the bundle of resources according to the request, wherein, when configured, the set of unused computing resources and the additional unused computing resources included in the bundle of resources are assigned to the second storage allocation.

19. The non-transitory computer-readable medium of claim 16, wherein the non-transitory computer-readable medium further includes instructions that, when executed by the one or more processors, cause the one or more processors to perform operations including:

determining an expected number of storage allocations for the category, wherein the expected number of storage allocations project storage allocations for subscriptions expected to be received after the current time;

determining that the expected number of storage allocations is greater than a number of bundles of resources associated with the category; and allocating additional bundles of resources, wherein allocating the additional bundles of resources includes allocating additional unused computing resources to each of the additional bundles of resources.

20. The non-transitory computer-readable medium of claim 16, wherein unused computing resources are computing resources that are not allocated to storage allocations.

21. The non-transitory computer-readable medium of claim 16, wherein increasing the size of the bundle of resources includes allocating unused physical storage to the bundle of resources.

* * * * *

UNITED STATES PATENT AND TRADEMARK OFFICE
CERTIFICATE OF CORRECTION

PATENT NO. : 10,496,306 B1  
APPLICATION NO. : 16/004638  
DATED : December 3, 2019  
INVENTOR(S) : Srivastava et al.

Page 1 of 1

It is certified that error appears in the above-identified patent and that said Letters Patent is hereby corrected as shown below:

In the Specification

In Column 4, Line 15, delete "things" and insert -- things. --, therefor.

In Column 4, Line 53, delete "can" and insert -- can be --, therefor.

In Column 14, Line 6, delete "separate" and insert -- separately --, therefor.

In Column 21, Line 54, delete "second first" and insert -- second --, therefor.

Signed and Sealed this  
Sixteenth Day of February, 2021

Drew Hirshfeld  
*Performing the Functions and Duties of the*  
*Under Secretary of Commerce for Intellectual Property and*  
*Director of the United States Patent and Trademark Office*